(12) United States Patent
Lim et al.

(10) Patent No.: US 11,677,940 B2
(45) Date of Patent: Jun. 13, 2023

(54) METHOD AND DEVICE FOR ENCODING/DECODING IMAGE, AND RECORDING MEDIUM HAVING STORED BITSTREAM

(71) Applicant: ELECTRONICS AND TELECOMMUNICATIONS RESEARCH INSTITUTE, Daejeon (KR)

(72) Inventors: Sung Chang Lim, Daejeon (KR); Jung Won Kang, Daejeon (KR); Hyun Suk Ko, Daejeon (KR); Jin Ho Lee, Daejeon (KR); Ha Hyun Lee, Seoul (KR); Dong San Jun, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 117 days.

(21) Appl. No.: 16/648,470

(22) PCT Filed: Sep. 20, 2018

(86) PCT No.: PCT/KR2018/011139
§ 371 (c)(1),
(2) Date: Mar. 18, 2020

(87) PCT Pub. No.: WO2019/059676
PCT Pub. Date: Mar. 28, 2019

(65) Prior Publication Data
US 2021/0368172 A1 Nov. 25, 2021

(30) Foreign Application Priority Data

Sep. 20, 2017 (KR) .................. 10-2017-0121006
Jun. 22, 2018 (KR) .................. 10-2018-0071825

(51) Int. Cl.
H04N 19/119 (2014.01)
H04N 19/159 (2014.01)
(Continued)

(52) U.S. Cl.
CPC ......... *H04N 19/119* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS 9,467,701 B2 * 10/2016 Guo ................... H04N 19/176
9,544,595 B2    1/2017 Kim et al.
(Continued)

FOREIGN PATENT DOCUMENTS

CN    107005718 A    8/2017
KR    10-0772576 B1    11/2007
(Continued)

OTHER PUBLICATIONS

International Search Report dated Jan. 3, 2019 in counterpart International Patent Application No. PCT/KR2018/011139 (3 pages in English and 3 pages in Korean).
(Continued)

*Primary Examiner* — Kaitlin A Retallick
(74) *Attorney, Agent, or Firm* — NSIP Law

(57) ABSTRACT

The present invention relates to an image encoding/decoding method. The image decoding method includes splitting a coding tree unit (CTU) into at least one coding unit (CU) according to a block splitting structure and performing CU-based decoding, in which the block partition structure is
(Continued)

configured such that at least one of binary tree splitting and ternary tree splitting is performed after quadtree splitting is performed.

15 Claims, 20 Drawing Sheets

(51) Int. Cl.
*H04N 19/176* (2014.01)
*H04N 19/186* (2014.01)
*H04N 19/169* (2014.01)
*H04N 19/46* (2014.01)
*H04N 19/96* (2014.01)

(52) U.S. Cl.
CPC ....... *H04N 19/186* (2014.11); *H04N 19/1883* (2014.11); *H04N 19/46* (2014.11); *H04N 19/96* (2014.11)

(56) References Cited

U.S. PATENT DOCUMENTS

| | | | |
|---|---|---|---|
| 2015/0208094 A1 | 7/2015 | Lee et al. | |
| 2015/0358631 A1* | 12/2015 | Zhang | H04N 19/176 375/240.16 |
| 2017/0347128 A1* | 11/2017 | Panusopone | H04N 19/96 |
| 2018/0103268 A1* | 4/2018 | Huang | H04N 19/91 |
| 2019/0149828 A1* | 5/2019 | Jeong | H04N 19/176 375/240.12 |
| 2019/0215531 A1* | 7/2019 | Lee | H04N 19/577 |
| 2019/0253737 A1* | 8/2019 | Chono | H04N 19/463 |
| 2021/0329241 A1* | 10/2021 | Lim | H04N 19/96 |

FOREIGN PATENT DOCUMENTS

| | | |
|---|---|---|
| KR | 10-2012-0035126 A | 4/2012 |
| KR | 10-2015-0027530 A | 3/2015 |
| KR | 10-2017-0077203 A | 7/2017 |
| WO | WO 2016/200241 A1 | 12/2016 |
| WO | WO 2017/088170 A1 | 6/2017 |
| WO | WO 2017/088810 A1 | 6/2017 |
| WO | WO 2017/090967 A1 | 6/2017 |
| WO | WO 2017/122997 A1 | 7/2017 |
| WO | WO 2017/138791 A1 | 8/2017 |
| WO | WO 2018/070550 A1 | 4/2018 |

OTHER PUBLICATIONS

An, Jicheng, et al. "Quadtree plus binary tree structure integration with JEM tools." *Joint Video Exploration Team (JVET) of ITU-T SG 16 WP 3 and ISO/IEC JTC 1/SC 29/WG 11 3rd Meeting: Geneva, CH, JVET-C0024* May 26-Jun. 1, 2016 (5 pages in English).

Li, Xiang, et al. "Multi-type-tree." *Joint Video Exploration Team (JVET) of ITU-T SG 16 WP 3 and ISO/IEC JTC 1/SC 29/WG 11 4th Meeting: Chengdu, CN, 15-21 JVET-D0117* Oct. 2016 (3 pages in English).

* cited by examiner

FIG. 10
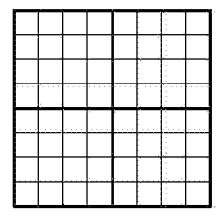 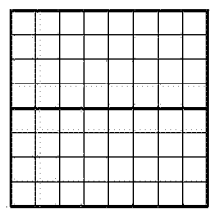 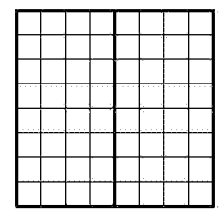
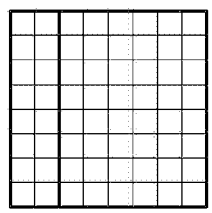 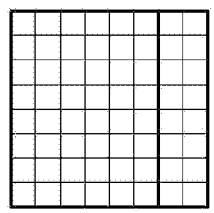 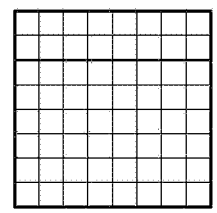 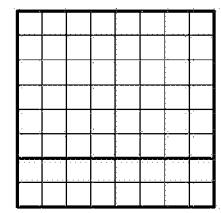
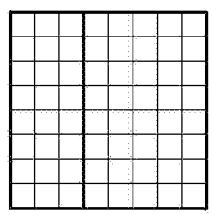 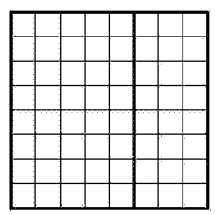 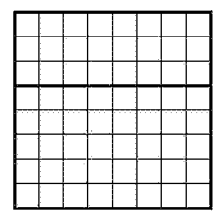 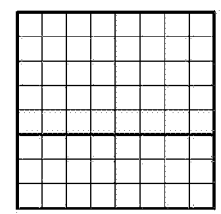

FIG. 11
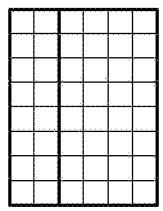 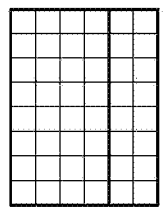 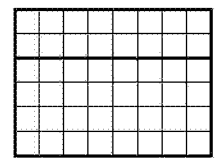 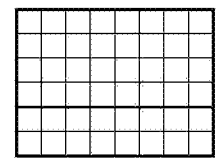
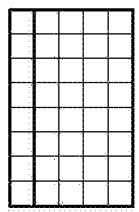 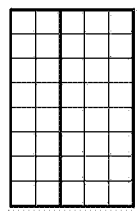 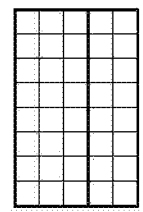 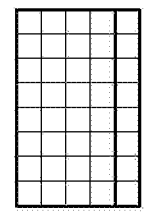
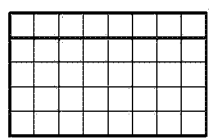 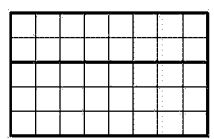 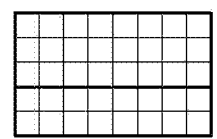 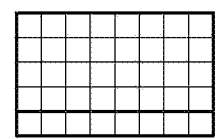

FIG. 17A

| | allowed | b0 | b1 | b2 |
|---|---|---|---|---|
| NO_SPLIT | ○ | 0 | | |
| BI_VER_SPLIT | ○ | 1 | 0 | 1 |
| BI_HOR_SPLIT | ○ | 1 | 0 | 0 |
| TRI_VER_SPLIT | ○ | 1 | 1 | 1 |
| TRI_HOR_SPLIT | ○ | 1 | 1 | 0 |

Number of split modes 4

FIG. 17B

| | allowed | b0 | b1 | b2 |
|---|---|---|---|---|
| NO_SPLIT | ○ | 0 | | |
| BI_VER_SPLIT | ○ | 1 | 1 | 0 |
| BI_HOR_SPLIT | ○ | 1 | 0 | 0 |
| TRI_VER_SPLIT | × | | | |
| TRI_HOR_SPLIT | ○ | 1 | 0 | 1 |

Number of split modes 3

FIG. 17C

| | allowed | b0 | b1 | b2 |
|---|---|---|---|---|
| NO_SPLIT | ○ | 0 | | |
| BI_VER_SPLIT | ○ | 1 | 1 | |
| BI_HOR_SPLIT | ○ | 1 | 0 | |
| TRI_VER_SPLIT | × | | | |
| TRI_HOR_SPLIT | × | | | |

Number of split modes 2 (left table)

| | allowed | b0 | b1 | b2 |
|---|---|---|---|---|
| NO_SPLIT | ○ | 0 | | |
| BI_VER_SPLIT | × | | | |
| BI_HOR_SPLIT | ○ | 1 | 0 | |
| TRI_VER_SPLIT | × | | | |
| TRI_HOR_SPLIT | ○ | 1 | 1 | |

Number of split modes 2 (right table)

FIG. 17D

| | allowed | b0 | b1 | b2 |
|---|---|---|---|---|
| NO_SPLIT | ○ | 0 | | |
| BI_VER_SPLIT | × | | | |
| BI_HOR_SPLIT | ○ | 1 | | |
| TRI_VER_SPLIT | × | | | |
| TRI_HOR_SPLIT | × | | | |

Number of split modes 1

| Binarization | Tree Type |
|---|---|
| 0 | no_split |
| 11 | split_to_square |
| 1000 | splti_bt_hor |
| 1001 | splti_tt_hor |
| 1010 | splti_bt_ver |
| 1011 | splti_tt_ver |

FIG. 22
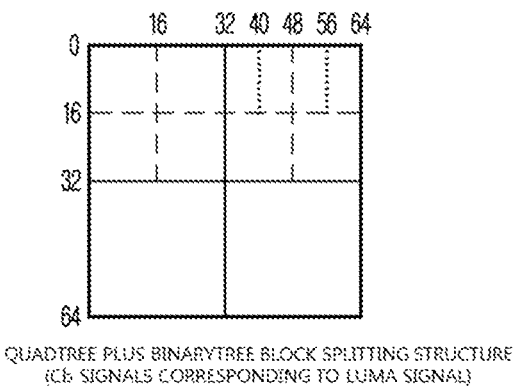
QUADTREE PLUS BINARYTREE BLOCK SPLITTING STRUCTURE
(Cb SIGNALS CORRESPONDING TO LUMA SIGNAL)
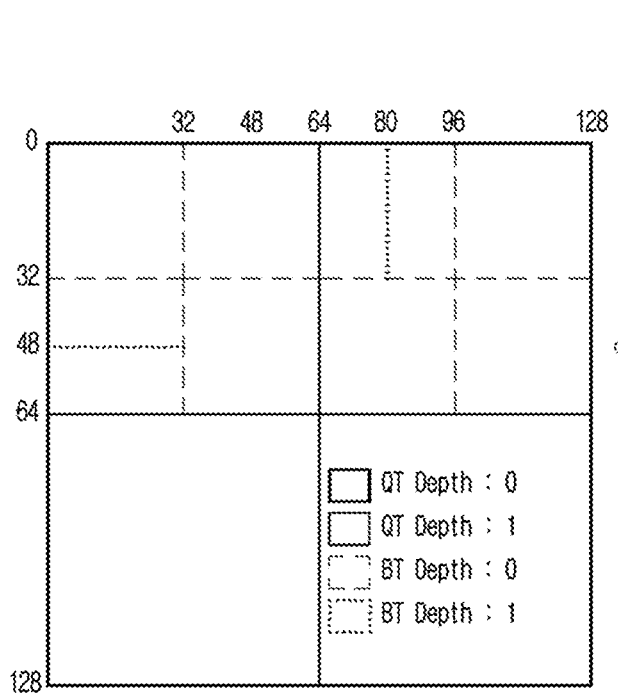
QUADTREE PLUS BINARYTREE BLOCK SPLITTING STRUCTURE
(LUMA SIGNAL)
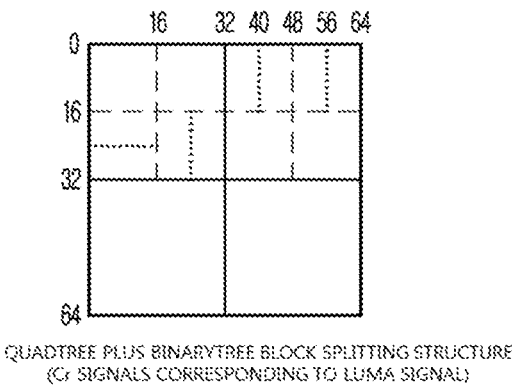
QUADTREE PLUS BINARYTREE BLOCK SPLITTING STRUCTURE
(Cr SIGNALS CORRESPONDING TO LUMA SIGNAL)

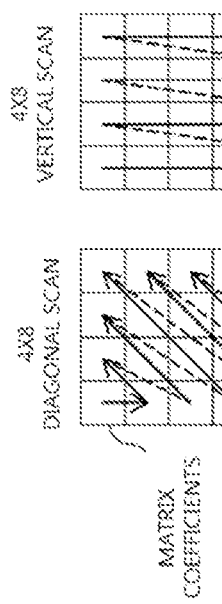
FIG. 23A
FIG. 23B
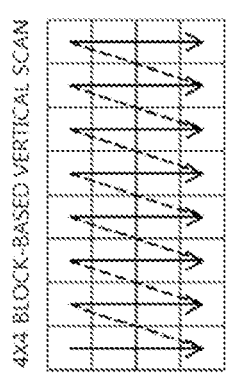
FIG. 23C
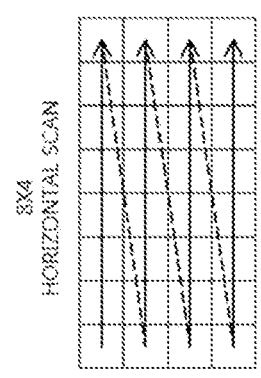
FIG. 23D
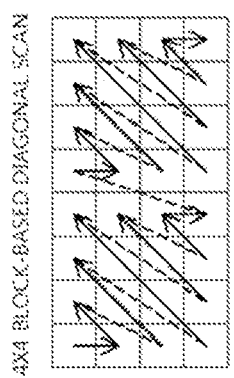
FIG. 23E
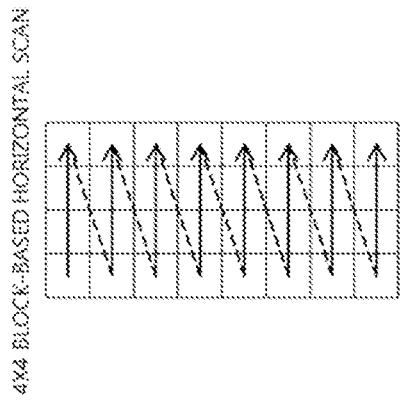
FIG. 23F

METHOD AND DEVICE FOR ENCODING/DECODING IMAGE, AND RECORDING MEDIUM HAVING STORED BITSTREAM

CROSS-RELATED TO RELATED APPLICATIONS

This application is a U.S. National Stage Application of International Application No. PCT/KR2018/011139, filed on Sep. 20, 2018, which claims the benefit under 35 USC 119(a) and 365(b) of Korean Patent Application No. 10-2017-0121006, filed on Sep. 20, 2017, and Korean Patent Application No. 10-2018-0071825, filed on Jun. 22, 2018 in the Korean Intellectual Property Office, the entire disclosure of which is incorporated herein by reference for all purposes.

TECHNICAL FIELD

The present invention relates to an image encoding/decoding method, an image encoding/decoding apparatus, and a recording medium in which a bitstream is stored. In particular, the present invention relates to an image encoding/decoding method and apparatus using various block splitting structures.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

Meanwhile, in the image encoding/decoding, a Coding Unit (CU) may be used for splitting the image efficiently. the Coding Unit may be used as a basic unit of image encoding/decoding.

In a conventional image encoding/decoding method and apparatus, a coding unit has a square shape and is split in a quadtree form at all times. Therefore, there is a limitation in encoding or decoding an image to adapt to various local content characteristics.

DISCLOSURE

Technical Problem

Accordingly, the present invention has been made keeping in mind the above problems occurring in the prior art, and an object of the present invention is to provide a method and apparatus for encoding/decoding an image using various block splitting structures to improve image encoding/decoding efficiency.

Technical Solution

A method of decoding an image according to the present invention, the method may comprise splitting a coding tree unit (CTU) into at least one coding unit (CU) according to a block splitting structure; and performing CU-based decoding, wherein the block splitting structure is configured such that at least one of binary tree splitting and ternary tree splitting is performed after quadtree splitting is performed.

In the method of decoding an image according to the present invention, wherein the CU-based decoding is achieved by performing either or both of intra prediction and inter prediction on a per coding unit basis.

In the method of decoding an image according to the present invention, wherein the CU-based decoding is achieved by performing at least one of inverse transform and dequantization on a per coding unit basis.

In the method of decoding an image according to the present invention, wherein the binary trees include a vertical binary tree and a horizontal binary tree, and the ternary trees include a vertical ternary tree and a horizontal ternary tree.

In the method of decoding an image according to the present invention, wherein the block splitting structure is determined on the basis of at least one of a first flag indicating whether or not quadtree splitting needs to be performed, a second flag indicating whether or not binary/ternary tree splitting needs to be performed, a third flag indicating either a vertical split or a horizontal split, and a fourth flag indicating either the binary tree splitting or the ternary tree splitting.

In the method of decoding an image according to the present invention, wherein the block splitting structure is determined on the basis of at least one of a quadtree root node size, a minimal allowed quadtree leaf node size, a maximal allowed binary tree root node size, a maximal allowed ternary tree root node size, a maximal allowed binary/ternary tree depth, a minimal allowed binary tree leaf node size, and a minimal allowed ternary tree lead node size.

In the method of decoding an image according to the present invention, wherein at least one of the quadtree root node size, the minimal allowed quadtree leaf node size, the maximal allowed binary tree root node size, a maximal allowed ternary tree root node size, the maximal allowed binary/ternary tree depth, the minimal allowed binary tree leaf node size, and the minimal allowed ternary tree lead node size is included in a sequence parameter set (SPS).

In the method of decoding an image according to the present invention, wherein the block splitting structure is determined on the basis of a maximal allowed transform size.

In the method of decoding an image according to the present invention, wherein when the coding tree unit is included in an intra slice, the block splitting structure of a luma signal of the coding tree unit and the block splitting structure of a chroma signal of the coding tree unit are independently determined of each other.

A method of encoding an image according to the present invention, the method may comprise splitting a coding tree unit (CTU) into at least one coding unit (CU) according to a block splitting structure; and performing CU-based encoding, wherein the block splitting structure is configured such that quadtree splitting is performed first and at least one of binary tree splitting and ternary tree splitting is then performed.

In the method of encoding an image according to the present invention, wherein the CU-based encoding is achieved by performing either or both of intra prediction and inter prediction on a per coding unit basis.

In the method of encoding an image according to the present invention, wherein the CU-based encoding is achieved by performing at least one of inverse transform and dequantization on a per coding unit basis.

In the method of encoding an image according to the present invention, wherein the block splitting structure is limited on the basis of at least one of a quadtree root node size, a minimal allowed quadtree leaf node size, a maximal allowed binary tree root node size, a maximal allowed ternary tree root node size, a maximal allowed binary/ternary tree depth, a minimal allowed binary tree leaf node size, and a minimal allowed ternary tree lead node size.

In the method of encoding an image according to the present invention, wherein at least one of the quadtree root node size, the minimal allowed quadtree leaf node size, the maximal allowed binary tree root node size, a maximal allowed ternary tree root node size, the maximal allowed binary/ternary tree depth, the minimal allowed binary tree leaf node size, and the minimal allowed ternary tree lead node size is included in a sequence parameter set (SPS).

In the method of encoding an image according to the present invention, wherein the block splitting structure is determined on the basis of a maximal allowed transform size.

In the method of encoding an image according to the present invention, wherein when the coding tree unit is included in an intra slice, the block splitting structure of a luma signal of the coding tree unit and the block splitting structure of a chroma signal of the coding tree unit are independently determined of each other.

A computer readable recording medium storing a program, wherein an image encoding method is executed as below when the program is executed by a processor: splitting a coding tree unit (CTU) into at least one coding unit (CU) according to a block splitting structure; and performing CU-based encoding, wherein the block splitting structure is configured such that quadtree splitting is performed first and then at least one of binary tree splitting and ternary tree splitting is performed.

Advantageous Effects

The present invention can provide a method and apparatus for encoding/decoding an image using various block splitting structures in order to improve image encoding/decoding efficiency.

According to the present invention, image encoding/decoding efficiency can be improved.

According to the present invention, the computational complexity of an image encoder and an image decoder can be reduced.

DESCRIPTION OF DRAWINGS

FIG. 10 illustrates examples of a quadtree plus shifted binary tree splitting structure in which splitting by the powers of 2 is possible;

FIG. 11 illustrates examples of a quadtree plus shifted binary tree splitting structure in which splitting by the powers of 2 is not possible;

FIG. 17A, FIG. 17B, FIG. 17C and FIG. 17D are diagrams illustrating bit allocation in each available splitting mode according to an embodiment of the present invention;

FIG. 22 is a diagram illustrating an example in which a chroma signal Cb and a chroma signal Cr in a CTU are split differently by a quadtree plus binary tree splitting;

FIGS. 23A, 23B, 23C, 23D, 23E, and 23F are diagrams illustrating exemplary scanning methods for scanning reconstructed quantization matrix coefficients;

BEST MODE

Mode for Invention

Figure 1:
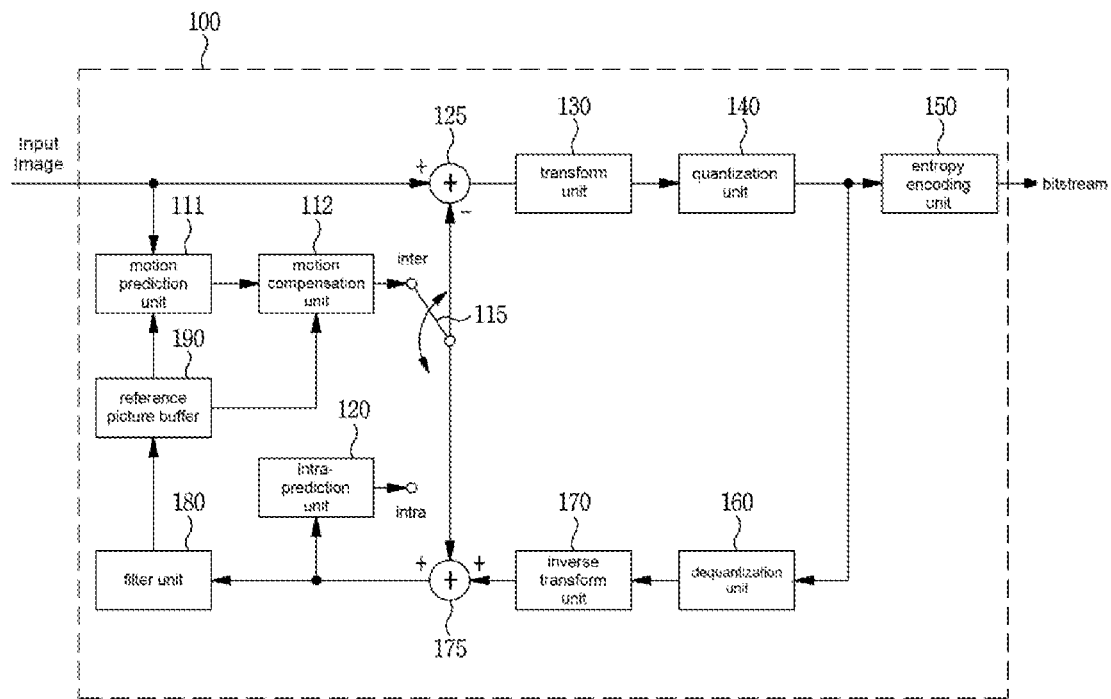
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator: may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag: indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index: may refer to an index indicating a specific reference picture in a reference picture list.

Reference picture: may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector: may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range: may be a two-dimensional region which is searched to retrieve a motion vector during inter prediction. For example, the size of the search range may be M×N. Here, M and N are both integers.

Motion vector candidate: may refer to a prediction candidate block or a motion vector of the prediction candidate block when predicting a motion vector. In addition, a motion vector candidate may be included in a motion vector candidate list.

Motion vector candidate list: may mean a list composed of one or more motion vector candidates.

Motion vector candidate index: may mean an indicator indicating a motion vector candidate in a motion vector candidate list. Alternatively, it may be an index of a motion vector predictor.

Motion information: may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list: may mean a list composed of one or more merge candidates.

Merge candidate: may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index: may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
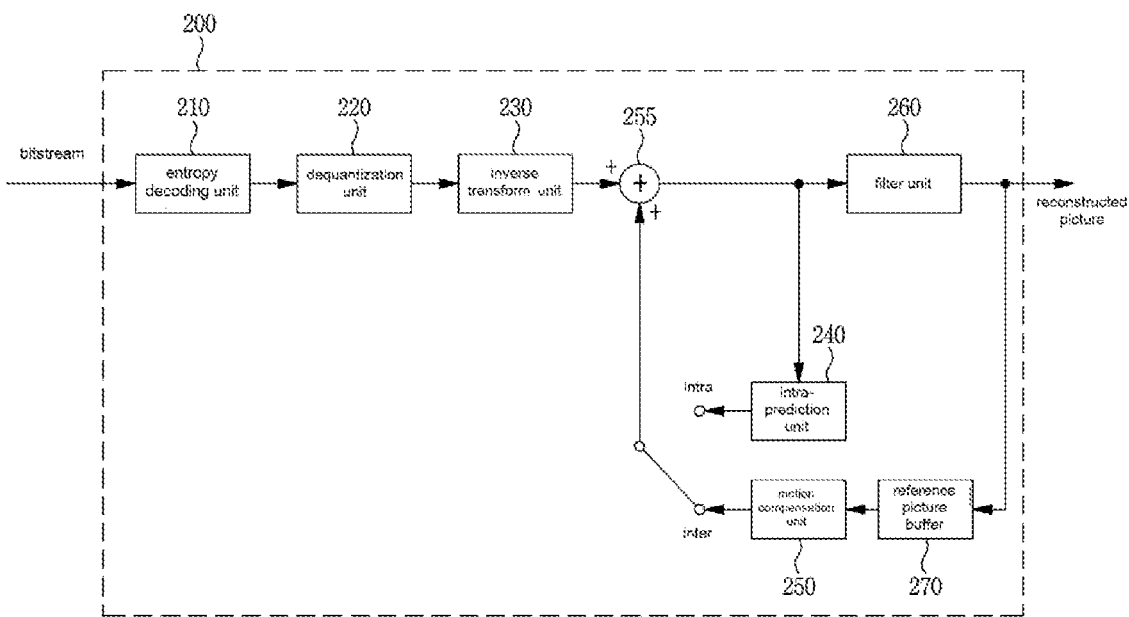
FIG. 2 is a block diagram showing configurations of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
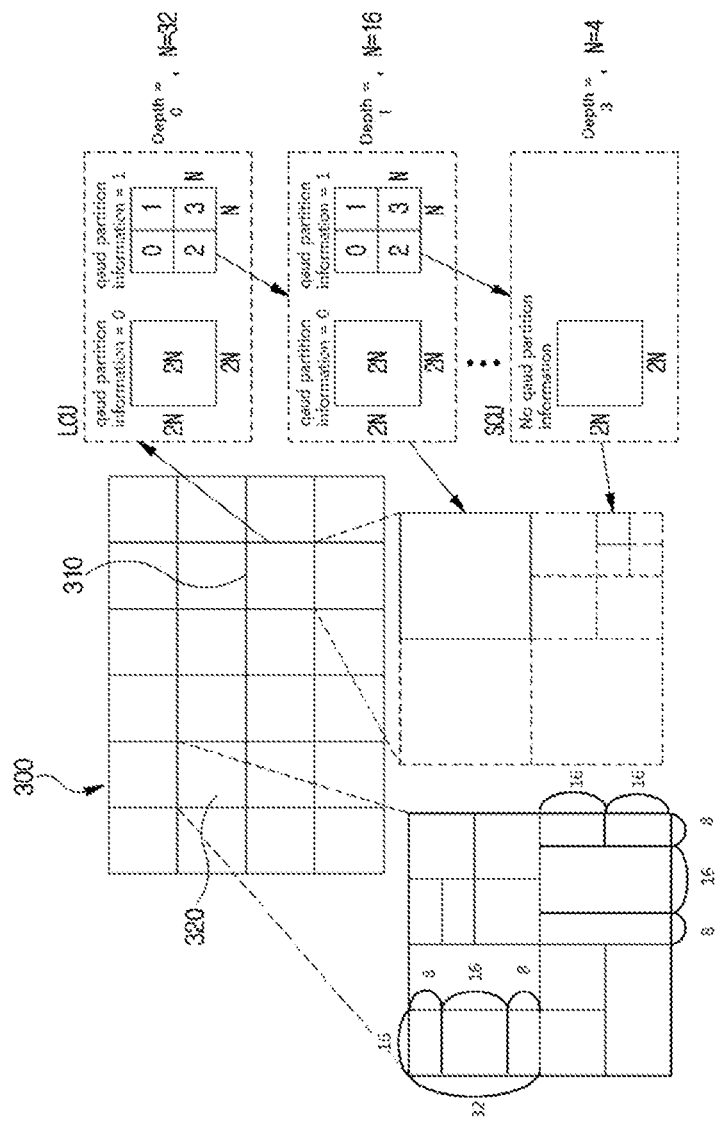
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

The quadtree splitting, the binary tree splitting, the ternary tree splitting, and the combined tree splitting have been described with reference to FIG. 3. Herein after, referring to FIG. 4 through 23, image partitioning structures according to other various embodiments will be described.

Figure 4:
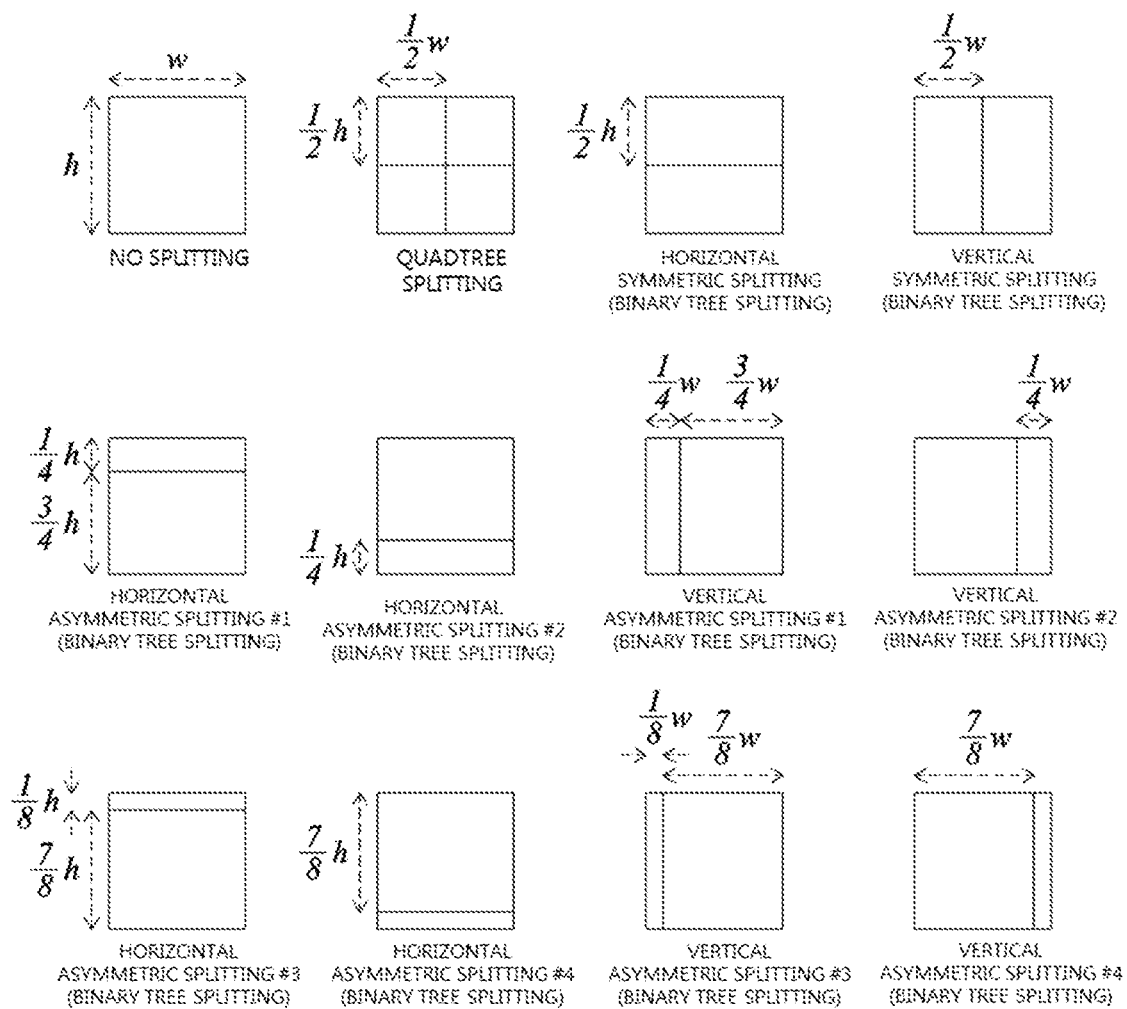
FIG. 4 is a diagram illustrating quadtree splitting, symmetric binary tree (SBT) splitting, and asymmetric binary tree (ABT) splitting according to embodiments of the present invention.

FIG. 4 is a diagram illustrating quadtree splitting, symmetric binary tree (SBT) splitting, and asymmetric binary tree (ABT) splitting according to embodiments of the present invention. In FIG. 4, w represents a horizontal size (width) of a block and h represents a vertical size (height) of the block.

Referring to FIG. 4, the quadtree splitting refers a split type in which one block is split into four sub-blocks wherein the horizontal size and the vertical size of each of the sub-blocks resulting from the splitting is half the horizontal size and the vertical size of the original block, respectively.

The binary tree splitting refers to a split type in which one block is split into two sub-blocks. There are two types of binary tree splitting: symmetric and asymmetric. For the symmetric binary tree splitting, there are two types: horizontal and vertical. For the asymmetric binary tree splitting, there are also two types: horizontal and vertical. On the other hand, a binary tree leaf node refers to a coding unit (CU).

Nodes generated by a symmetric binary tree splitting have equal sizes. On the other hand, nodes generated by an asymmetric binary tree splitting have different sizes.

In FIG. 4, as examples of asymmetric binary tree splitting, 1:3, 3:1, 1:7, and 7:1 horizontal and vertical asymmetric binary tree splitting structures are shown.

QuadTree Plus BinaryTree (QT+BT) Splitting

One embodiment of the present invention provides a quadtree plus binary tree splitting structure. The quadtree plus binary tree splitting structure refers to a partitioning structure in which a block first undergoes a quadtree splitting and then undergoes a binary tree splitting.

For example, in the quadtree plus binary tree splitting structure, a coding tree unit (CTU) is first split by a quadtree splitting, and then each of the quadtree leaf nodes is further split by a binary tree splitting. Here, the binary tree leaf node or the quadtree leaf node is a coding unit (CU).

In the quadtree plus binary tree splitting structure, the binary tree splitting refers to only a symmetric binary tree splitting (i.e., a symmetric binary tree splitting after a quadtree splitting), or a combination of a symmetric binary tree splitting and an asymmetric binary tree splitting (i.e., an asymmetric binary tree splitting after a quadtree splitting).

For the symmetric binary tree splitting after the quadtree splitting (hereinafter, referred to as the quadtree plus binary tree splitting), either or both of a first flag and a first index are signaled: the first flag indicating whether a quadtree splitting needs to be performed; the first index indicating a horizontal symmetric split, a vertical symmetric split, or no further split. The first flag may have a first value indicating that a quadtree splitting needs to be performed or a second value indicating that no further splitting needs to be performed. The first index may have a first value indicating no further splitting needs to be performed, a second value indicating that a horizontal symmetric splitting needs to be performed, or a third value indicating that a vertical symmetric splitting needs to be performed. The first index is signaled only when the first flag has the second value. Further, when it is determined that a CU cannot be further split on the basis of the size and/or depth of the CU, the first flag and/or the first index is not signaled.

For another example, for the quadtree plus symmetric binary tree splitting structure, at least one of a first flag, a second flag, and a third flag is signaled: the first flag indicating whether a quadtree splitting needs to be performed; the second flag indicating whether a binary tree splitting needs to be performed; and the third flag indicating a horizontal symmetric split or a vertical symmetric split. The first flag may have a first value indicating that a quadtree splitting needs to be performed or a second value indicating that no further splitting needs to be performed. The second flag may have a first value indicating that a binary tree splitting needs to be performed or a second value indicating that no further splitting needs to be performed. The third flag may have a first value indicating that a horizontal symmetric splitting needs to be performed or a second value indicating that a vertical symmetric splitting needs to be performed. The second flag is signaled only when the first flag has the second value. The third flag is signaled only when the second flag has the first value. Further, when it is determined that a CU cannot be further split on the basis of the size and/or depth of the CU, the first flag, the second flag, and/or the third flag is not signaled.

Figure 5:
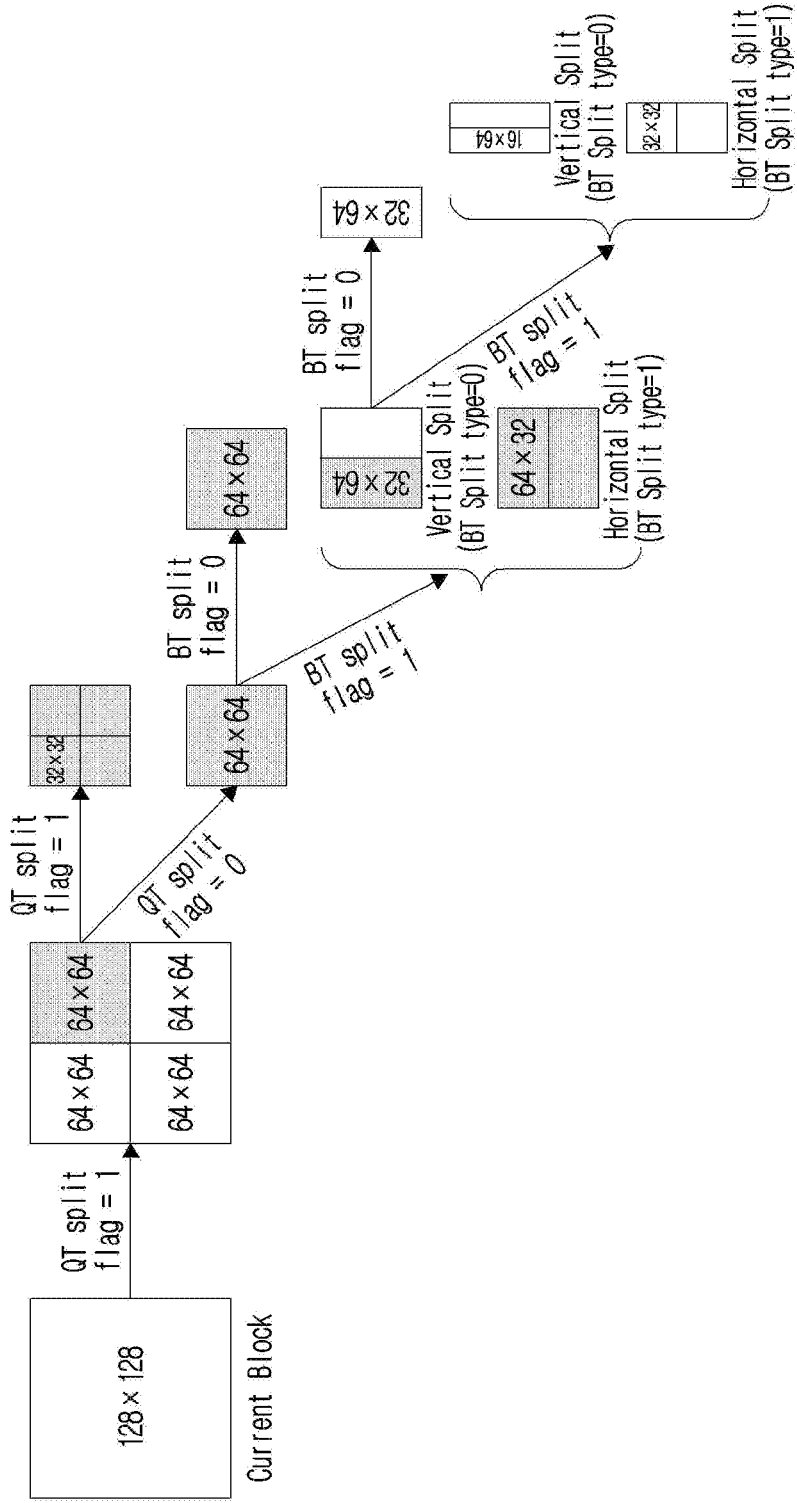
FIG. 5 illustrates an example of a quadtree plus symmetric binary tree splitting structure.

FIG. 5 illustrates an example of the quadtree plus symmetric binary tree splitting structure. In FIG. 5, a QT split flag indicates whether a quadtree splitting needs to be performed, a BT split flag indicates whether a binary tree splitting needs to be performed, and a BT split type indicates a horizontal split (a width direction split) or a vertical split (a height direction split).

Figure 6:
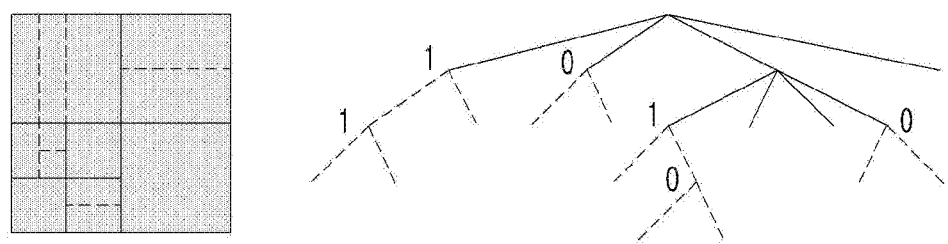
FIG. 6 is a diagram illustrating a coding tree unit (CTU) that is first split by a quadtree splitting and then by a symmetric binary tree splitting, and a corresponding tree structure.

FIG. 6 is a diagram illustrating a coding tree unit (CTU) that is split first by a quadtree splitting and then by a symmetric binary tree splitting, and a corresponding tree structure. In FIG. 6, solid lines represent partitions generated by a quadtree splitting, and dotted lines represent partitions generated by a binary tree splitting.

When a binary tree splitting is performed, a flag indicating a horizontal symmetric split or a vertical symmetric split is signaled. In the tree structure of FIG. 6, 0 represents a horizontal symmetric split and 1 represents a vertical symmetric split.

Figure 7:
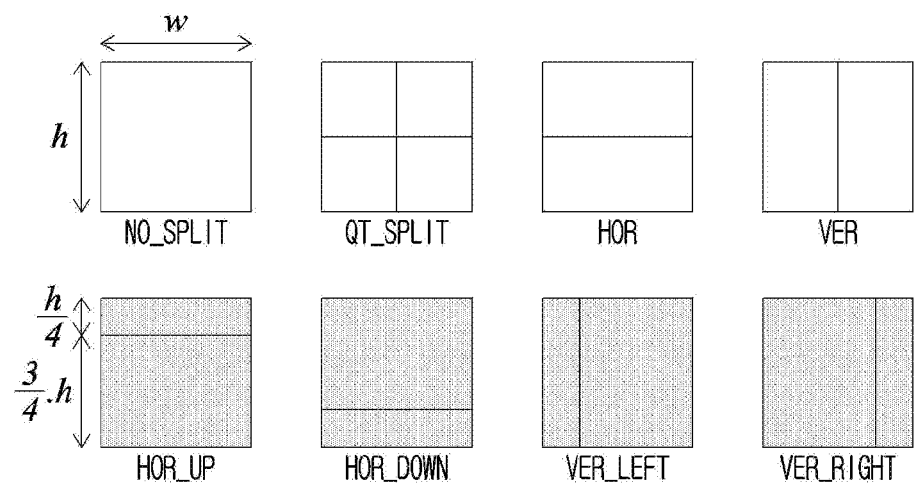
FIG. 7 illustrates examples of a quadtree plus asymmetric binary tree splitting structure.

FIG. 7 illustrates the quadtree plus asymmetric binary tree splitting structure according to an embodiment of the present invention.

Referring to FIG. 7, there are various types of the quadtree plus asymmetric binary tree splitting: quadtree splitting (QT_SPLIT), horizontal symmetric splitting (HOR), vertical symmetric splitting (VER), horizontal upper-side asymmetric splitting (HOR_UP), horizontal lower-side asymmetric splitting (HOR_DOWN), vertical left-side asymmetric splitting (VER_LEFT), and vertical right-side asymmetric splitting (VER_RIGHT). Thus, with the quadtree plus asymmetric binary tree splitting (namely, a asymmetric binary tree splitting after a quadtree splitting), it is possible to split a block into square sub-blocks or non-square sub-blocks.

Figure 8:
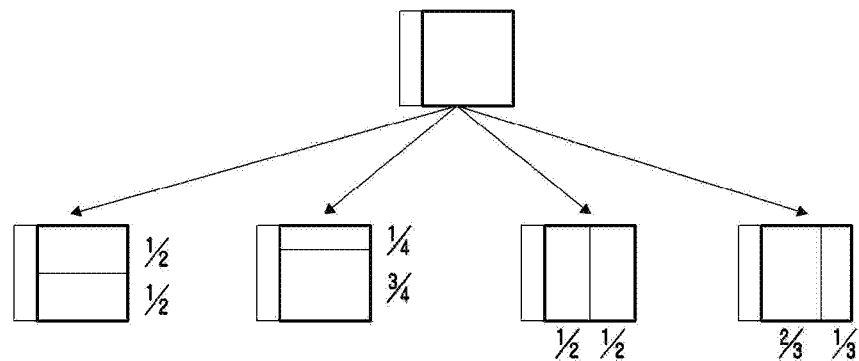
FIG. 8 is a diagram illustrating recursive execution of an asymmetric binary tree splitting in a quadtree plus asymmetric binary tree splitting structure according to an embodiment of the present invention.

FIG. 8 is a diagram illustrating recursive execution of asymmetric binary tree splitting in a quadtree plus asymmetric binary tree splitting structure.

Referring to FIG. 8, a block that has undergone an asymmetric binary tree splitting is further recursively split by an asymmetric binary tree splitting. In this case, the asymmetric binary tree splitting structures are categorized into a binary symmetric split, a binary asymmetric split in which the size is split by the power of 2 (for example, S/4 or 3*S/4), and a ternary asymmetric binary split (for example, S/3 or 2*S/3). Here, S represents the horizontal size or the vertical size of a higher-level block.

In the meantime, for the quadtree plus asymmetric binary tree splitting, at least one of the following flags is signaled: a first flag indicating whether a quadtree splitting needs to be performed; a second flag indicating whether a binary tree splitting needs to be performed; a third flag indicating a horizontal split or a vertical split; a fourth flag indicating a symmetric split or an asymmetric split; and a fifth flag indicating the type of asymmetric splitting (for example, left/upper or right/lower). The first flag may have a first value indicating that a quadtree splitting needs to be performed or a second value indicating that no further splitting needs to be performed. The second flag may have a first value indicating that a binary tree splitting needs to be performed or a second value indicating that no further splitting needs to be performed. The third flag may have a first value indicating a horizontal split or a second value indicating a vertical split. The fourth flag may have a first value indicating a symmetric split or a second value indicating an asymmetric split. The fifth flag may have a first value indicating a left side or an upper side or a second value indicating a right side or a lower side. The second flag is signaled only when the first flag has the second value. The third flag and the fourth flag are signaled only when the second flag has the first value. The fifth flag is signaled only when the fourth flag has the second value. Further, when it is determined that a CU cannot be further split on the basis of the size and/or depth of the CU, the first flag, the second flag, the third flag, the fourth flag, and/or the fifth flag is not signaled. Here, instead of the fifth flag, a first index indicating an asymmetric split can be signaled.

On the other hand, the first flag, the second flag, the third flag, the fourth flag, and the fifth flag (or the first index) are signaled as separate pieces of information, or some or all of the first through fifth flags may be collectively signaled as a single piece of information.

At least either one of binary tree splitting availability information and asymmetric splitting availability information is signaled at a higher level (for example, a video sequence level, a picture level, a slice level, a tile level, or a CTU level) than a CU. In this case, whether to signal the second flag, the third flag, the fourth flag, and the fifth flag (or the first index) is determined on the basis of at least one of the binary tree splitting availability information and the asymmetric splitting availability information. For example, when the binary tree splitting is not available, the second flag, the third flag, the fourth flag, and the fifth flag (or the first index) are not signaled. For example, when the binary tree splitting is available and the asymmetric splitting is not available, the fourth flag and the fifth flag (or the first index) are not signaled.

Alternatively, on the basis of the size and/or depth of a CU, whether the CU can be split by binary tree splitting or by asymmetric splitting is determined. For example, when an interest CU has a size that cannot be asymmetrically split, the fourth flag and the fifth flag (or the first index) for the interest CU are not signaled.

Figure 9:
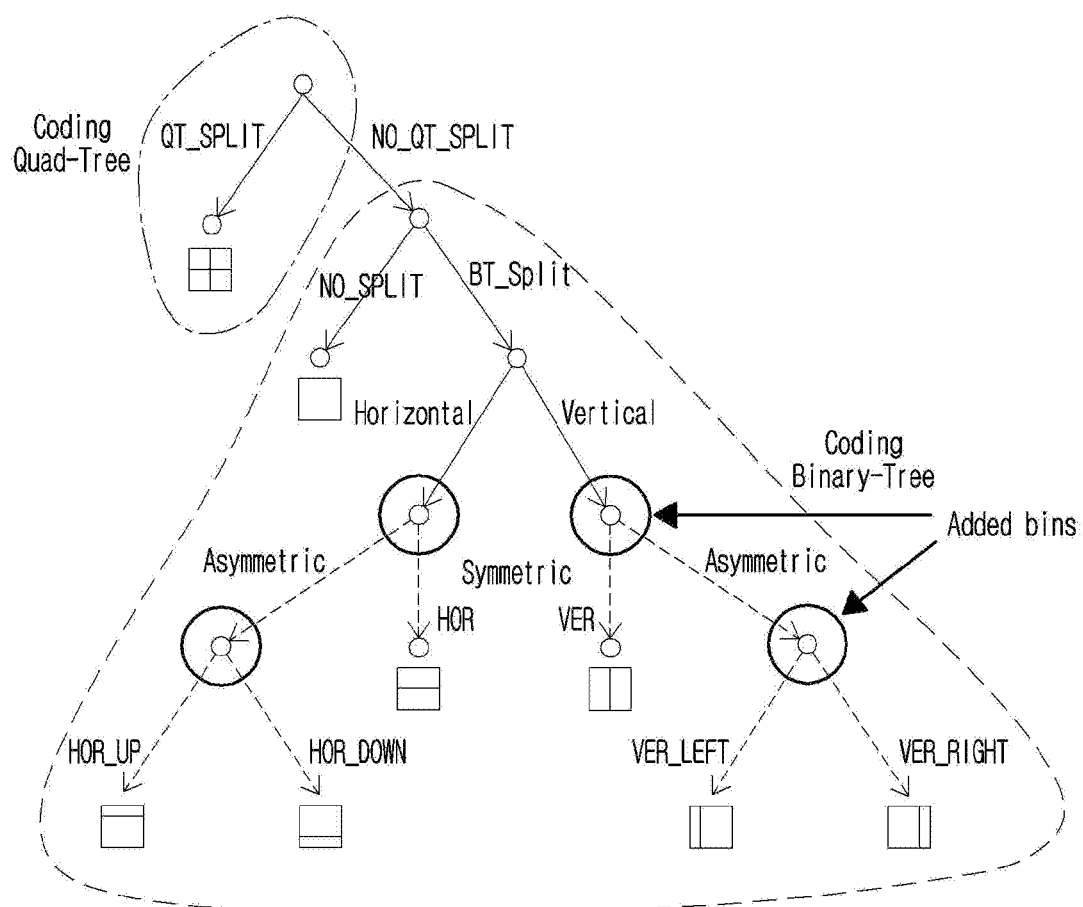
FIG. 9 is a diagram illustrating signaling of a quadtree plus asymmetric binary tree splitting.

FIG. 9 is a diagram illustrating signaling of the quadtree plus asymmetric binary tree splitting structure.

Referring to FIG. 9, by signaling a maximum of two bins in addition to the quadtree plus symmetric binary tree partitioning structure, the quadtree plus asymmetric binary tree partitioning structure can be represented.

In FIG. 9, a first bin indicates whether or not the asymmetric binary tree splitting is to be used. When the first bin is "asymmetric" which indicates that the asymmetric binary tree splitting is to be used, a second bin indicating the type of asymmetric splitting is additionally signaled.

On the other hand, the added two bins as illustrated in FIG. 9 are entropy-encoded/decoded as a single context.

As an example of the quadtree plus asymmetric binary tree splitting, there is a partitioning structure called "quadtree plus shifted binary tree splitting". The quadtree plus shifted binary tree splitting means a partitioning structure in which quadtree splitting is performed first and binary tree splitting with shifting is then performed.

FIGS. 10 and 11 illustrate an example of the quadtree plus shifted binary tree splitting.

FIG. 10 illustrates one embodiment of the quadtree plus shifted binary tree splitting in which splitting by the powers of 2 is possible.

In FIG. 10, the first row shows examples of quadtree splitting, horizontal symmetric splitting, and vertical symmetric splitting, respectively. In FIG. 10, the second row shows examples of 1:3 shifted binary tree splitting in various directions, and the third row shows examples of 3:5 shifted binary tree splitting in various directions.

When the horizontal size or the vertical size of a block is $2^n$ (n is a positive integer) and is equal to or smaller than M (here, M is a positive integer of, for example, 16), the block undergoes shifted binary tree splitting with a split ratio of 1:3, thereby generating smaller sub-blocks having a ¼ size and a ¾ size. When the horizontal size or the vertical size of a block is $2^n$ and is larger than M, the block undergoes shifted binary tree splitting with a split ratio of 3:5, thereby generating sub-blocks having a ⅜ size and a ⅝ size.

FIG. 11 illustrates one embodiment of the quadtree plus shifted binary tree splitting structure in which the splitting by the powers of 2 is not possible.

The first row, the second row, and the third row show examples of shifted binary tree splitting in various directions with a split ratio of 1:2, 1:4, and 2:3, respectively.

When the horizontal size or the vertical size of a block is not $2^n$ (n is a positive integer) but is $3 \times 2^n$, the block undergoes a shifted binary tree splitting with a split ratio of 1:2, thereby generating sub-blocks having a ⅓ size and a ⅔ size. When the horizontal size or the vertical size of a block is not $2^n$ but is $5 \times 2^n$, the block undergoes a shifted binary tree splitting with a split ratio of 1:4 to generate sub-blocks having a ⅕ size and a ⅘ size or undergoes a shifted binary tree splitting with a split ratio of 2:3 to generate sub-blocks having a ⅖ size and a ⅗ size.

Figure 12:
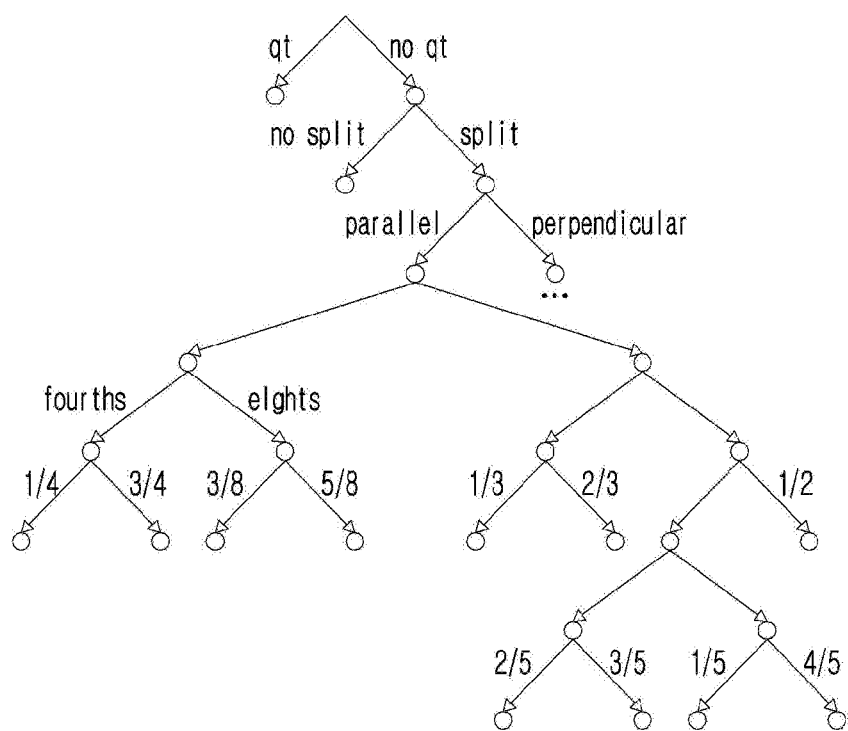
FIG. 12 is diagram illustrating signaling of a quadtree plus shifted binary tree splitting structure.

FIG. 12 is a diagram for description of signaling of a quadtree plus binary tree with shifting (QT+BTS) splitting structure.

The splitting by the binary tree with shifting (BTS) structure can be determined according to a split direction and a split ratio.

A binary tree split direction is entropy-encoded/decoded on the basis of a split direction of the previous splitting. In other words, instead of signaling a horizontal or vertical split, a perpendicular split or a parallel split can be signaled.

The perpendicular split means the opposite direction split with respect to the preceding splitting. For example, when the preceding splitting is a vertical direction split and the perpendicular split is signaled, a current block undergoes a horizontal split.

In contrast, the parallel split means the same direction split as the preceding splitting. For example, when the preceding splitting is a vertical direction split and the parallel split is signaled, a current block undergoes a vertical split.

Referring to FIG. 12, the first splitting is set according to the rules. For two split directions (perpendicular and parallel), two binary flags (i.e., perpend_split_flag and parallel_split_flag) are signaled. Subsequently, the split ratio is signaled using a binary decision tree.

In FIG. 12, since the hierarchical tree constructed under the perpendicular split is the same as that constructed under the parallel split, the same hierarchical tree structure is not illustrated. When a particular node has only a single child (leaf node), the split information is not signaled.

When a CU is split in accordance with a quadtree plus asymmetric binary tree splitting structure, which prediction (intra prediction or inter prediction) needs to be performed is determined at a block size level of 2×6, 2×14, 6×2, 14×2, or larger.

In the quadtree plus binary tree splitting structure, parameters for the next block splitting are defined and then entropy-encoded/decoded in units of a higher level. The higher-level units include at least one of a video parameter set (VPS), a sequence parameter set (SPS), a picture parameter set (PPS), a tile header, a slice header, and a coding tree unit (CTU).

CTUSize represents a quadtree root node size.

MinQtSize represents a minimal allowed quadtree lead node size.

MaxBtSize represents a maximal allowed binary tree root node size.

MaxBTDepth represents a maximal allowed binary tree depth.

MinBtSize represents a minimal allowed binary tree lead node size.

At least one of the parameters of the above-described block splitting structure can be used as the parameters of at least one of a luma signal and a chroma signal.

In addition, at least one of the parameters of the block splitting structure is entropy-encoded/decoded separately for the luma signal and the chroma signal to have different parameter values for the luma signal and the chroma signal. Furthermore, at least one of the parameters of the block splitting structure is entropy-encoded/decoded separately for a Cb signal and a Cr signal to have different parameter values for the Cb signal and the Cr signal.

At least one of the parameters of the block splitting structure can be used as the parameter of each slice type (namely, I, P, or B).

In addition, at least one of the parameters of the block splitting structure is entropy-encoded/decoded separately for each slice type to have different parameter values for the respective slice types.

In addition, at least one of the parameters of the block splitting structure may be determined on the basis of the comparison result between the depth or size of a current block and a predetermined threshold value. The predetermined threshold value means a reference depth or size deciding the block structure. The threshold value can be represented in the form of at least one of a minimum value and a maximum value. The predetermined threshold value is a fixed value that is preset at an encoder and a decoder side, or a variable value derived on the basis of the coding parameters of a current block or a neighboring block. Alternatively, the predetermined threshold value may be signaled as a piece of information included in a bitstream.

An example of the quadtree plus binary tree splitting structure, the CTUSize is set to 128×128 luma samples or 64×64 chroma samples.

The MinQTSize is set to 16×16 samples, the MaxBTSize is set to 64×64 samples, the MinBTSize is set to 4×4 samples in each dimension (each of the width and the height), and the MaxBTDepth is set to four (4).

A CTU undergoes quadtree splitting to generate quadtree leaf nodes.

The quadtree splitting is recursively performed until the MinQTSize is reached.

The size of the quadtree leaf node ranges from a size of 16×16 samples (namely, the MinQTSize) to a size of 128×128 samples (namely, the CTUSize).

When a quadtree leaf node has a size of 128×128 samples, since its MaxBTsize is larger than 64×64 samples, the binary tree splitting is not performed. Otherwise, (that is, when a quadtree leaf node has a size smaller than 64×64 samples), the quadtree leaf node is split by binary tree splitting. In other words, when the size of a quadtree leaf node is not larger than the MaxBTSize, the quadtree leaf node is recursively split by binary tree splitting. Thus, the quadtree leaf node serves as the root node of a binary tree and may have a binary tree depth of zero.

When the binary tree depth reaches the MaxBTDEpth=4, no further binary tree splitting is performed. When the horizontal size (width) of a binary tree node is equal to the MinBTSize=4, the binary tree node does not undergo additional horizontal symmetric splitting. Similarly, when the vertical size (height) of a binary tree node is equal to the MinBTSize=4, the binary tree node does not undergo additional vertical symmetric splitting. When the horizontal size (width) of a binary tree node is equal to the MinBTSize=4, the binary tree node does not undergo additional vertical symmetric splitting. Similarly, when the vertical size of a binary tree node is equal to the MinBTSize=4, the binary tree node does not undergo additional horizontal symmetric splitting.

These binary tree leaf nodes undergo at least one of processes including prediction, transform, quantization, dequantization, inverse transform, and transform coefficient encoding/decoding, without undergoing an additional splitting.

The aforementioned values of the CTUSize, MinQTSize, MaxBTSize, MaxBTDepth, and MinBTSize are presented only for illustrative purposes and are not limited thereto.

In the quadtree plus binary tree splitting structure, when at least one of the block size, the split depth, and the region to undergo the quadtree splitting is identical to at least one of the block size, the split depth, and the region to undergo the binary tree splitting, information of the quadtree partition structure and information of the binary tree partition structure are signaled together. In this case, when the overlapping of at least one of the block size, the split depth, and the region between the quadtree splitting structure and the binary tree splitting structure is minimized, for at least one of the block size, the split depth, and the region, the information of only the quadtree splitting structure can be signaled, and the information of only the binary tree splitting structure can be signaled.

To this end, at least one of the parameters for a quadtree plus binary tree block splitting structure may be determined on the basis of the comparison between a predetermined threshold value and at least one of the block size, the split depth, and the region. The predetermined threshold value may mean at least one of a reference block size, a reference split depth, and a reference region to determine the block structure. The threshold value can be represented in the form of at least one of a minimum value and a maximum value. The predetermined threshold value is a fixed value that is preset at the encoder side and the decoder side, or a variable value derived on the basis of the coding parameters of a current block or a neighboring block. Alternatively, the predetermined threshold value may be signaled as a piece of information included in a bitstream.

For example, at the encoder side and the decoder side, the minimal allowed quadtree lead node size MinQTSize may be set to a fixed value of N×N, and the maximal allowed binary tree root node size MaxBTSize may be set to a fixed value of M×M. Here, M is less than N. For example, N is a fixed value of 16 and M is a fixed value of 8.

Combined Quadtree and Binarytree (CQB) Splitting

A partitioning structure according to one embodiment of the present invention can be a combined quadtree and binary tree (CQB) splitting structure. The combined quadtree and binary tree splitting structure refers to a partitioning structure in which a quadtree split and a binary tree split can be performed without priority. As described above, in the quadtree plus binary tree splitting structure, a quadtree split is necessarily performed first. However, in the combined quadtree and binary tree (CQB) splitting structure, it is not necessary that the quadtree splitting precedes the binary tree splitting. That is, the binary tree splitting can precede the quadtree splitting.

Figure 13:
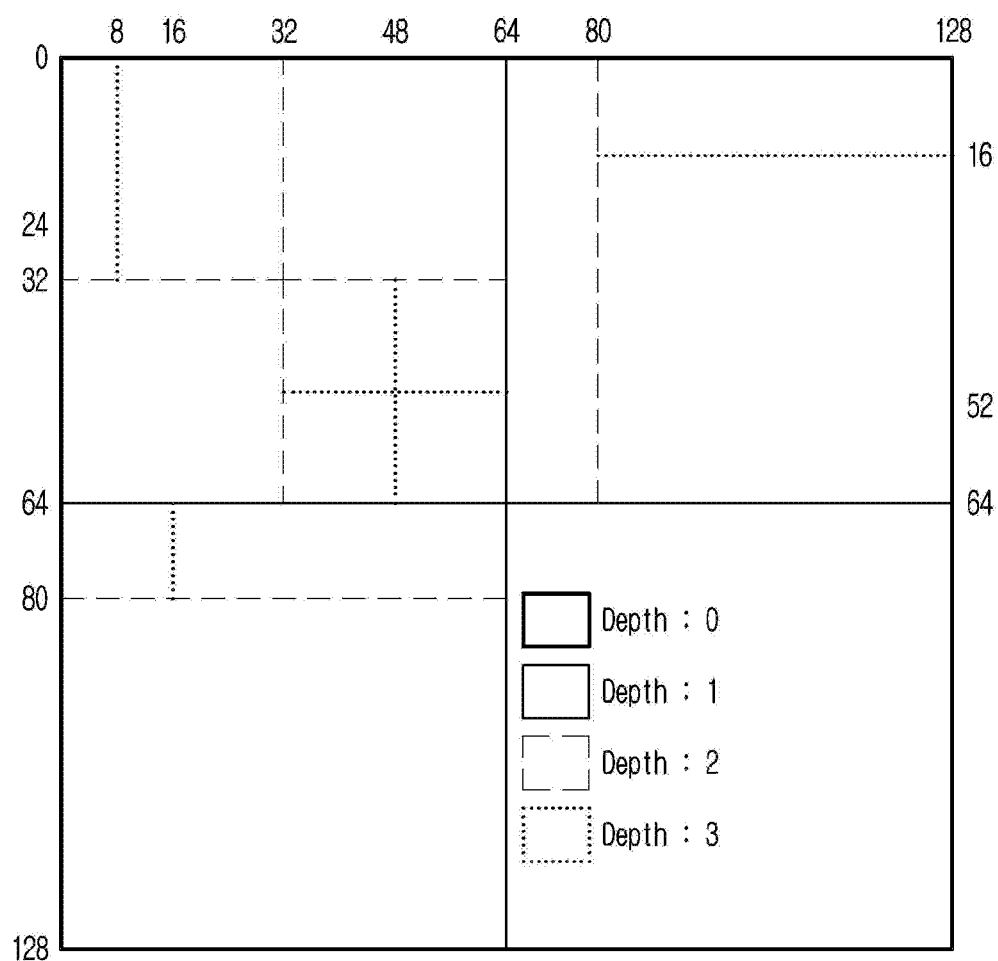
FIG. 13 illustrates a combined quadtree and binary tree splitting structure according to an embodiment of the present invention.
Figure 14A:
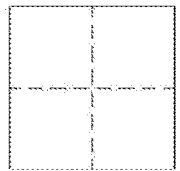
FIGS. 14A, 14B, 14C, 14D and 14E illustrate a quadtree plus binary/ternary tree splitting structure according to an embodiment of the present invention.
Figure 14B:
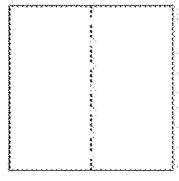
Figure 14C:
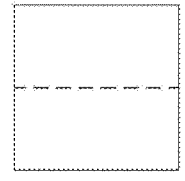
Figure 14D:
Figure 14E:
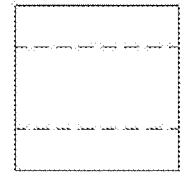
Figures 15A, 15B:
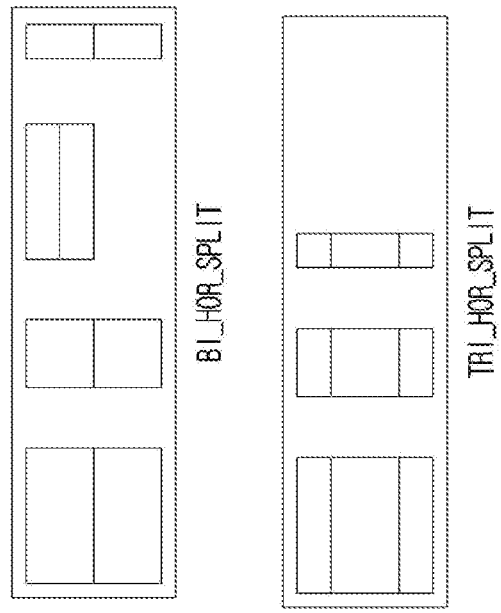
FIGS. 15A, 15B, 15C and 15D illustrate vertical binary tree splitting (BI_VER_SPLIT), horizontal binary tree splitting (BI_HOL_SPLIT), vertical ternary tree splitting (TRI_VER_SPLIT), and horizontal ternary tree splitting (TRI_HOL_SPLIT) for each block type, according to embodiments of the present invention.
Figures 15C, 15D:
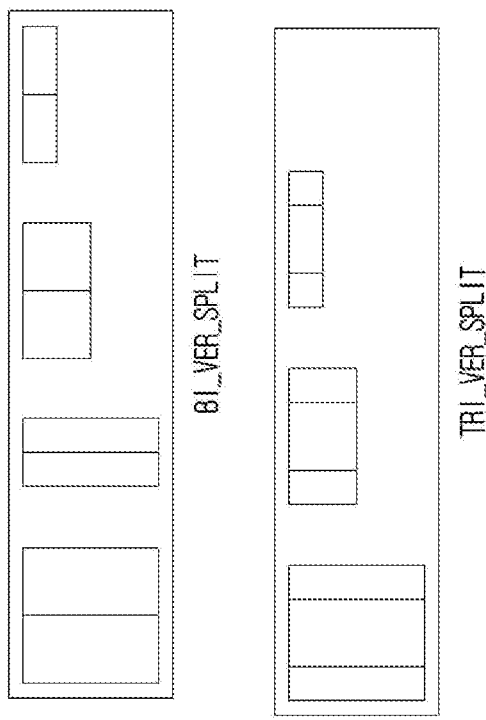

FIG. 13 illustrates a combined quadtree and binary tree splitting structure according to an embodiment of the present invention.

Referring to FIG. 13, in the combined quadtree and binary tree splitting structure, a CU undergoes a quadtree split or a binary tree split. Here, when the CU is to be divided into two smaller units, the CU will be split by binary tree splitting. Meanwhile, when the CU is to be divided into four smaller units, the CU will be split by quadtree splitting. Since the CUs are generated by performing the combined quadtree and binary tree splitting on a CTU, each CU may have a square shape or a non-square (rectangular) shape.

By using the combined quadtree and binary tree splitting structure, it is possible to encode/decode an image in the form of non-square blocks having a width not less than a first particular value and a height not less than a second particular value.

For the combined quadtree and binary tree splitting, either or both of a first index and a second index are signaled: the first index indicating a quadtree split, a binary tree split, or no further split; and the second index indicating a horizontal split or a vertical split.

The first index may have a first value indicating no further split, a second value indicating a quadtree split, or a third value indicating a binary tree split. The first flag may have a first value indicating a horizontal split (namely, a width direction split) or a second value indicating a vertical split (namely, a height direction split). The first flag is signaled only when the first index has the third value.

Here, when a quadtree split is performed on the basis of the value of the first index, all child nodes resulting from the split have a size half the size of the parent node in each dimension. In this case, all the child nodes include four nodes and have an equal size. Here, the parent node refers to a target block to be split, and the child node refers to a block generated through the splitting of the target block. Each child node has a size of M×N. Here, M and N each are positive integers, such as 1, 2, 4, 8, 16, 32, and so forth.

When a block is split in the form of a binary tree structure on the basis of the first index and the first flag, the second index indicating split position information is additionally signaled.

The current block is split in the form of a binary tree structure on the basis of the split position information. For the horizontal binary tree splitting, the split position information means an offset per N samples (per N-sample offset) with reference to at least one of the position, size, and shape of the parent node. In this case, a per N-sample offset from the upper end of the parent node or a per N-sample offset from the lower end of the parent node may mean the split position information. Where N is a positive integer, such as 1, 2, 4, 8, 16, 32, and so forth.

Similarly, for a vertical binary tree split, the split position information means an offset per N samples (per N-sample offset) with reference to at least one of the position, size, and shape of the parent node. In this case, a per N-sample offset from the left end of the parent node or a per N-sample offset from the right end of the parent node may mean the split position information.

The split position information is signaled in the form of an index indicating a value within a pre-configured set of offsets, which is configured on the basis of the width (horizontal size) or the height (vertical size) of a block.

Here, the N value, which is the processing unit for offsetting, is entropy-encoded/decoded in units of a higher level and is then be used to represent the combined quadtree and binary tree splitting structure. The higher-level units include at least one of a video parameter set (VPS), a sequence parameter set (SPS), a picture parameter set (PPS), a tile header, a slice header, and a coding tree unit (CTU). The N value can be used as the parameter of at least one of luma and chroma signals. In addition, the N value may be entropy-encoded/decoded separately for the luma signal and the chroma signal to have different parameter values for the luma signal and the chroma signal. The N value may be entropy-encoded/decoded separately for a Cb signal and a Cr signal to have different values for the Cb signal and the Cr signal. The N value may be used as the parameter of each slice type (I, P, or B). In addition, the N value may be entropy-encoded/decoded separately for each slice type to have different parameter values for the respective slice types.

The N value may be a fixed value that is preset at the encoder side and the decoder side, or a variable value derived on the basis of the coding parameters of a current block or a neighboring block. In addition, according to the N value, at least one of a context model decision and a context model update is performed on the basis of the depth or the size of the current block. Alternatively, at least one of the context model determination and the context model update is performed on the basis of another flag or index indicating the block splitting structure.

At least one of the aforementioned indexes and flags is entropy-encoded/decoded at a CU level, a CTU level, or a higher level. Alternatively, at least one of the indexes and the flags may be a fixed value preset at the encoder side and the decoder side, or may be a variable value derived on the basis of the coding parameters of a current block or a neighboring block.

According to at least one of the indexes and the flags, at least one of the context model decision and the context model update is performed is performed on the basis of the depth or the size of a current block. At least one of the context model decision and the context model update is performed on the basis of another flag and another index indicating the block splitting structure.

A CTU can be split by a quad tree structure or a binary tree structure. At this time, the quadtree leaf node or the binary tree leaf node means a coding unit (CU).

In the combined quadtree and binary tree splitting structure, the parameters of the splitting structure of the next block are defined, are entropy-encoded/decoded at a higher level, and are used to represent the combined quadtree and binary tree form block splitting structure. The higher-levels include at least one of a video parameter set (VPS), a sequence parameter set (SPS), a picture parameter set (PPS), a tile header, a slice header, and a CTU.

CTUSize represents a root node size.

MinCUSize represents a minimal allowed leaf node size.

MaxCUDepth represents a maximal allowed CU depth.

At least one of the parameters of the above-described block splitting structure can be used as the parameter of at least one of luma and chroma signals.

In addition, at least one of the parameters of the block splitting structure is entropy-encoded/decoded separately for the luma signal and the chroma signal to have different parameter values for the luma signal and the chroma signal. At least one of the parameters of the block splitting structure is entropy-encoded/decoded separately for a Cb signal and a Cr signal to have different parameter values for the Cb signal and the Cr signal.

At least one of the parameters of the block splitting structure can be used as the parameter of each slice type (namely, I, P, or B).

In addition, at least one of the parameters of the block splitting structure is entropy-encoded/decoded separately for each slice type to have different parameter values for the respective slice types.

In addition, at least one of the parameters of the block splitting structure may be determined on the basis of the comparison result between the depth or size of a current block and a predetermined threshold value. The predetermined threshold value means a reference depth or size that determines a block structure. The threshold value can be represented in the form of at least one of a minimum value and a maximum value. The predetermined threshold value is a fixed value that is preset at the encoder side and the decoder side, or a variable value derived on the basis of the coding parameters of a current block or a neighboring block. Alternatively, the predetermined threshold value may be signaled as a piece of information included in a bitstream.

For example, in the combined quadtree and binary tree splitting structure, the CTUSize is a size of 128×128 luma samples or a size of 64×64 chroma samples.

The MinCUSize is set to 4×4 samples, and the MaxCUDepth is set to five (5). A CTU undergoes quadtree or binary tree splitting to generate leaf nodes. The quadtree splitting or the binary tree splitting is recursively performed until the block size reaches the MinCUSize.

When the CU depth reaches the MaxCUDepth=5, no further splitting is performed. In addition, when the horizontal size or the vertical size of a quadtree node is equal to the MinCUSize=4, no further splitting is performed. When the horizontal size of the binary tree node is equal to the MinCUSize=4, no further horizontal symmetric splitting is performed. Similarly, when the vertical size of the binary tree node is equal to the MinCUSize=4, no further vertical symmetric splitting is performed. In addition, when the horizontal size of the binary tree node is equal to the MinCUSize=4, no further vertical symmetric splitting is performed. Similarly, the vertical size of the binary tree node is equal to the MinCUSize=4, no further horizontal symmetric splitting is performed.

When a CU is split by using the combined quadtree and binary tree splitting structure, which prediction mode between intra prediction and inter prediction is used is determined in units of a block having a size of 2×4, 4×4, 4×2, 4×8, 8×4, or larger, which is the leaf node size set MinCUSize. The leaf node undergoes at least one of processes such as prediction, transform, quantization, dequantization, inverse transform, and transform coefficients encoding/decoding, without undergoing further splitting.

The above-mentioned values of the CTUSize, the MinCuSize, and the MaxCuDepth are presented for illustrative purposes and are not limited thereto.

QuadTree Plus BinaryTree and TernaryTree (QT+BTTT)

One embodiment of the present invention provides a quadtree plus binary/ternary tree splitting structure. The quadtree plus binary/ternary tree splitting refers to a partitioning structure in which a quadtree splitting is primarily performed and a binary or ternary tree splitting is secondarily performed. Here, the binary/ternary tree may be the combined tree which has been described with reference to FIG. 3. Accordingly, the quadtree plus binary/ternary tree splitting structure can be referred to as a quadtree plus multi-type tree splitting structure.

FIGS. 14A, 14B, 14C, 14D and 14E illustrate splitting forms used in the quadtree plus binary/ternary tree splitting, in which 14A represents quadtree splitting, 14B represents vertical binary tree splitting, 14C represents horizontal binary tree splitting, 14D represents vertical ternary tree splitting, and 14E represents horizontal ternary tree splitting.

FIGS. 15 15A, 15B, 15C and 15D illustrate examples of partitioning, including vertical binary tree splitting (BI_VER_SPLIT), horizontal binary tree splitting (BI_HOL_SPLIT), vertical ternary tree splitting (TRI_VER_SPLIT), and horizontal ternary tree splitting according to a block type. BI_VER_SPLIT, BI_HOL_SPLIT, TRI_VER_SPLIT, and TRI_HOL_SPLIT mean a vertical binary tree splitting mode, a horizontal binary tree splitting mode, a vertical ternary tree splitting mode, and a horizontal ternary tree splitting mode, respectively. Aside from these, there are additional splitting modes: NO_SPLIT indicating no further splitting; and QUAD_SPLIT indicating a quadtree splitting mode.

When the quadtree plus binary/ternary tree splitting is performed, a CTU is first split by a quadtree splitting and then the maximum-sized CU is further recursively split by at least one of the binary tree splitting and the triple tree splitting. For example, when a CTU has a 256×256 size, the CTU is split into four 128×128 CUs, and each of the 128×128 CUs is the maximum CU and can be more deeply split.

By using the binary/ternary tree splitting structure, square CUs and non-square CUs can be generated.

When a CTU has a 128×128 size, the CTU may not undergo a quadtree splitting.

In the above-mentioned embodiments, the form of a CU is represented by a ratio of the horizontal size and the vertical size of the CU. For example, when the horizontal size is identical to the vertical size, the CU can be represented as a 1:1 CU or a square CU. When the horizontal size is 64 and the vertical size is 16, the CU is represented as a 1:4 CU or a non-square CU.

The block partitioning is performed on the basis of an allowed block split type, a minimal allowed size, and a maximum allowed size. That is, the number of allowable block splitting modes is determined on the basis of information of a minimum size and a maximum size for each block split type.

Specifically, allowable splitting modes for a current CU vary depending on signaling of a higher-level. For example, for each CU form, the maximum size and the minimum size are signaled with a higher-level parameter set or header. (Here, all sizes are represented in a log 2 scale, and minus2 is a value obtained by subtracting two from the log 2 scale original size.)

log 2_cu_11_ratio_max_minus2: a maximal allowed size of a 1:1 CU.

log 2_cu_11_ratio_min_minus2: a minimal allowed size of a 1:1 CU.

log 2_cu_12_ratio_max_minus2: a maximal allowed size of a 1:2 CU or a 2:1 CU (longer side).

log 2_cu_12_ratio_min_minus2: a minimal allowed size of a 1:2 or 2:1 CU (longer side).

log 2_cu_14_ratio_max_minus2: a maximal allowed size of a 1:4 or 4:1 CU (longer side).

log 2_cu_14_ratio_min_minus2: a minimal allowed size of a 1:4 or 4:1 CU (longer side).

log 2_tri_split_max_minus2: a maximal allowed size of a ternary splitting tree (longer side).

log 2_tri_split_min_minus2: a minimal allowed size of a ternary tree partition (longer side).

For example, when a CU has a size of 128×128 samples and the log 2_cu_12_ratio_max_minus2 is 4 (namely, the maximal allowed size of a 1:2 CU is 64), vertical splitting mode and horizontal splitting mode are not allowed.

For another example, when a CU has a horizontal size greater than 64 and a vertical size greater than 64, the horizontal binary tree splitting will not be allowed. In addition, a CU has a horizontal size greater than 64 and a vertical size of 64, information related to the horizontal binary tree splitting is not signaled. Otherwise, the horizontal binary tree splitting is allowed and information related to the horizontal binary tree splitting is signaled.

For a further example, when a CU has a vertical size greater than 64 and a horizontal size of 64, the vertical binary tree splitting is not allowed. In addition, when a CU has a vertical size greater than 64 and a horizontal size of 64, information related to the vertical binary tree splitting is not signaled. Otherwise, the vertical binary tree splitting is allowed and information related to the vertical binary tree splitting is signaled.

The horizontal and/or vertical size of a CU is not limited to 64. The horizontal and/or vertical size of a CU cannot be compared with the value of M. In addition, the M has the same value as the maximum value of the horizontal and/or vertical size of a transform or inverse transform unit. In addition, the M has the same value as the maximum value of the horizontal and/or vertical size of a transform or inverse transform matrix.

The value of the M may be entropy-encoded/decoded at one or more levels including a video parameter set (VPS), a sequence parameter set (SPS), a picture parameter set (PPS), a tile header, a slice header, and a coding tree unit (CTU). Alternatively, the M may be a value which is preset at the encoder side and the decoder side.

For a further example, when a CU has a size of 128×128 samples and the log 2_tri_split_max_minus2 is four (namely, a ternary tree maximal allowed size is 64), a ternary tree splitting mode may not be allowed. That is, a CU has a horizontal size greater than 64 and a vertical size greater than 64, the ternary tree splitting may not be allowed. Alternatively, when a CU has a horizontal size or a vertical size greater than 64, information related to the ternary tree splitting may not be signaled. When a CU has a horizontal size and a vertical size which are equal to or less than 64, the ternary tree splitting is allowed. In addition, when a CU has a horizontal size or a vertical size which is equal to or less than 64, information related to the ternary tree splitting is not signaled. In this case, as the ternary tree splitting, at least one of the horizontal ternary tree splitting and the vertical ternary tree splitting is used.

For a further example, when a CU is greater than 64 in both of the horizontal size and the vertical size, the ternary tree splitting may not be allowed. In addition, when a CU is greater than 64 in both of the horizontal size and the vertical size, information related to the ternary tree splitting is not signaled. Accordingly, when a CU is equal to or less than 64 in both of the horizontal size and the vertical size, the ternary tree splitting may be allowed. In addition, when a CU is equal to or less than 64 in both of the horizontal size and the vertical size, information related to the ternary tree splitting may be signaled. In this case, as the ternary tree splitting, at least one of the horizontal ternary tree splitting and the vertical ternary tree splitting may be used.

For a further example, when a CU has a horizontal size greater than 64 and a vertical size equal to 64, the ternary tree splitting may not be allowed. In addition, when a CU has a horizontal size greater than 64 and a vertical size equal to 64, information related to the ternary tree splitting may not be signaled. Accordingly, when a CU is equal to or less than 64 in both of the horizontal size and the vertical size, the ternary tree splitting may be allowed. In addition, when a CU is equal to or less than 64 in both of the horizontal size and the vertical size, information related to the ternary tree splitting may be signaled. In this case, as the ternary tree splitting, at least one of the horizontal ternary tree splitting and the vertical ternary tree splitting is used.

For a further example, when a CU has a vertical size greater than 64 and a horizontal size equal to 64, the ternary tree splitting is not allowed. In addition, when a CU has a vertical size greater than 64 and a horizontal size equal to 64, information related to the ternary tree splitting is not signaled. Accordingly, when a CU is 64 or less in both of the horizontal size and the vertical size, the ternary tree splitting is allowed. In addition, when a CU is 64 or less in both of the horizontal size and the vertical size, information related to the ternary tree splitting is signaled. In this case, as the ternary tree splitting, at least one of the horizontal ternary tree splitting and the vertical ternary tree splitting is used.

The horizontal and/or vertical size of a CU is not limited to 64. The horizontal and/or vertical size of a CU may be compared with N. The N may have the same value as the maximum value of the horizontal size and/or the vertical size of a transform or inverse transform block. Alternatively, the N may have the same value as the maximum value of the horizontal and/or vertical size of a transform or inverse transform matrix.

The value of the N may be entropy-encoded/decoded in units of at least one of a video parameter set (VPS), a sequence parameter set (SPS), a picture parameter set (PPS), a tile header, a slice header, and a coding tree unit (CTU). The N may be a value preset at the encoder side and the decoder side.

Figure 16:
FIG. 16 is a diagram illustrating splitting modes available in the quadtree plus binary/ternary tree splitting structure.

FIG. 16 is a diagram for description of allowable splitting modes in the quadtree plus binary/ternary tree splitting structure.

When a current CU has a size of 64×64 samples, log 2_tri_split_max_minus2 is 4 (namely, a CU maximum size that allows the ternary tree splitting is 64), log 2_cu_12_ratio_max_minus2 is 4 (namely, the maximal allowed size of a 1:2 CU is 64), and log 2_cu_14_ratio_max_minus2 is 3 (namely, the maximal allowed size of a 1:4 CU is 32), a vertical ternary tree mode (TRI_VER_SPLIT) in which CUs having a 16×64 size or a 64×16 size are generated or a horizontal ternary tree mode (TRI_HOR_SPLIT) in which CUs having a 16×64 size or a 64×16 size are generated are not allowed.

When a current CU has a 32×64 size, log 2_tri_split_max_minus2 is 4 (namely, a maximum CU size that allows the ternary tree splitting is 64), log 2_cu_12_ratio_max_minus2 is 4 (namely, the maximal allowed size of a 1:2 CU is 64), and log 2_cu_14_ratio_max_minus2 is 3 (namely, the maximal allowed size of a 1:4 CU is 32), a vertical binary tree mode (BI_VER_SPLIT) and a vertical ternary tree mode (TRI_VER_SPLIT) in which CUs having a 16×64 size or a 64×16 size are generated are not allowed.

FIG. 17A, FIG. 17B, FIGS. 17C and 17D are diagrams illustrating an embodiment of bit allocation in each allowable splitting mode.

Referring to FIG. 17, when the number of allowable splitting modes is one, one bit is allocated for representation of the splitting mode. When the number of allowable splitting modes is two, a maximum of two bits are allocated for representation of the splitting mode. When the number of allowable splitting modes is three or four, a maximum of three bits are allocated for representation of the splitting mode.

Figure 18:
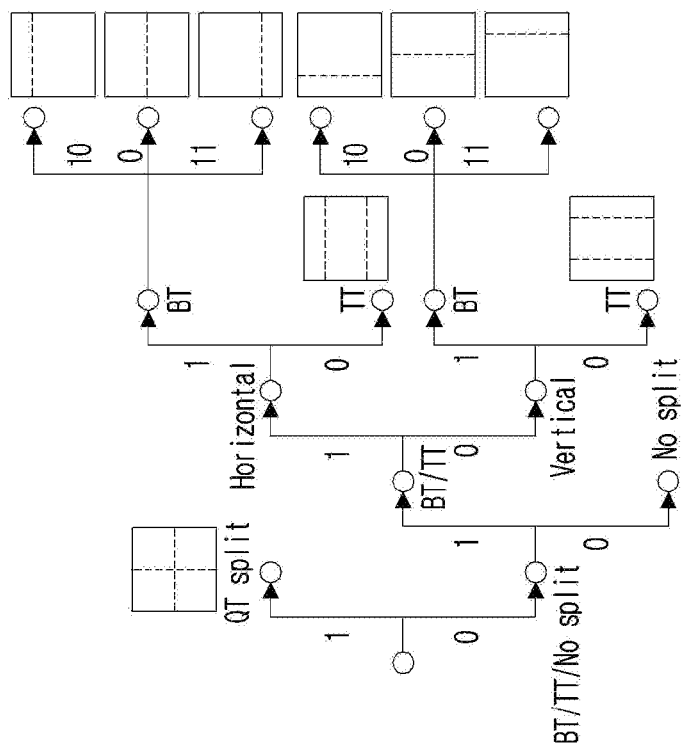
FIG. 18 is a diagram illustrating signaling of a quadtree plus binary/ternary tree splitting structure.

FIG. 18 is a diagram for description of signaling of the quadtree plus binary/ternary tree splitting structure.

Referring to FIG. 18, when a current block is split in accordance with the quadtree plus binary/ternary tree splitting structure, the first bin represents whether or not quadtree splitting is performed, the second bin represents whether or not the binary/ternary tree splitting is performed, the third bin indicates either a vertical split or a horizontal split, the fourth bin indicates either the binary tree splitting or the ternary tree splitting, and the fifth and sixth bins represent the type of the binary tree splitting.

The bins shown in FIG. 18 are signaled as a plurality of syntax elements (or multiple pieces of information) or as one syntax element (or one piece of information). When signaled as the plurality of syntax elements, at least one of a first flag, a second flag, a third flag, a fourth flag, and a first index is signaled: the first flag indicating whether or not quadtree splitting is performed; the second flag indicating whether or not the binary/ternary tree splitting is performed; the third flag indicating either a vertical split or a horizontal split; the fourth flag indicating either the binary tree splitting or the ternary tree splitting; and the first index indicating the type of the binary tree splitting.

In FIG. 18, the third bin indicates either a vertical split or a horizontal split, the fourth bin indicates either the binary tree splitting or the ternary tree splitting. However, the invention is not limited thereto. The third bin may indicate at least one of the binary tree splitting and the ternary tree splitting, and the fourth bin may indicate at least one of a horizontal split and a vertical split.

In the quadtree plus binary/ternary tree splitting structure, the following parameters are defined, and entropy-encoded/decoded at a higher level. The higher-level units include at least one of a video parameter set (VPS), a sequence parameter set (SPS), a picture parameter set (PPS), a tile header, a slice heater, and a coding tree unit (CTU).

CTUSize represents a quadtree root node size.

MinQtSize represents a minimal allowed quadtree leaf node size.

MaxBtSize represents a maximal allowed binary tree root node size.

MaxTtSize represents a maximal allowed ternary tree root node size.

MaxMttDepth represents a maximal allowed binary/ternary tree depth.

MinBtSize represents a minimal allowed lead node size.

MinTtSize represents a minimal allowed ternary tree leaf node size.

A block having a horizontal size or a vertical size greater than a maximum transform size is automatically split. That is, when at least one of the horizontal size and the vertical size of a block is greater than the maximum transform size, the quadtree splitting is automatically performed without explicit signaling.

For example, a coding unit (CU) (or a coding block (CB)) having a horizontal size or a vertical size greater than the maximum transform size (namely, 64) is assumed to be further split by quadtree splitting, without explicit signaling (namely, implicitly).

In another embodiment, in an intra slice, the value of a coded block flag (CBF) is assumed to be zero when a CU has a horizontal size or a vertical size greater than 64.

In an intra slice, for a CU having a horizontal size or a vertical size greater than 64, a skip mode is derived and applied.

On the other hand, in an inter slice, for a CU having a horizontal size or a vertical size greater than 128, at least one of a skip mode and an AMVP mode (CBF=0) is applied. The CBF of the AVMP mode is not signaled but is assumed to be zero.

In the quadtree plus binary/ternary tree splitting structure, there may be overlapping split patterns. In this case, a particular splitting structure can be forbidden to prevent the overlapping split patterns.

For example, two consecutive stages of binary tree splitting in a first direction can produce the same partitions as a combined process in which one stage of ternary tree splitting in the first direction is first performed and one stage of binary tree splitting in the first direction is then performed on a center-positioned block in some cases. That is, the partitions produced by two consecutive stages of binary tree splitting may overlap as the partitions produced by a combined process consisting of one stage of ternary tree splitting and the subsequent stage of binary tree splitting at a center-positioned block. Accordingly, to prevent overlapping partitions, the binary tree splitting on the center-positioned block may not be allowed after the ternary tree splitting is performed.

In the quadtree plus binary/ternary tree splitting structure, a tree node block may exist at the lower boundary of an image or may span the right boundary of the image. To enable all the CUs to be present inside the boundary of an image, the tree node blocks existing at the lower boundary or spanning the right boundary may be split in manners described below.

(1) When a tree node block covers both of the lower boundary and the right boundary of an image, when a current block is a quadtree node block and has a size larger than the maximal allowed quadtree lead node size, the current block is split by the quadtree splitting, and otherwise, the current block is split by the horizontal binary tree splitting.

(2) When a tree node block covers the lower boundary of an image, when a current block is a quadtree node block and has a size larger than the minimal allowed quadtree leaf node size and then the maximal allowed binary tree root node size, the current block is split by the quadtree splitting, when a current block is a quadtree node block and has a size larger than the minimal allowed quadtree leaf node size and smaller than the maximal allowed binary tree root node size, the current block is split by the quadtree splitting or the horizontal binary tree splitting, and otherwise, the current block is split by the horizontal binary tree splitting.

(3) When an image of a tree node block covers the right boundary, when a current block is a quadtree node block and has a size larger than the minimal allowed quadtree leaf node size and larger than the maximal allowed binary tree root node size, the current block is split by the quadtree splitting, when a current block is a quadtree node block and has a size larger than the minimal allowed quadtree leaf node size and equal to or smaller than the maximal allowed binary tree root node size, the current block is split by the quadtree splitting or the vertical binary tree splitting, and otherwise, the current block is split by the vertical binary tree splitting.

Split To Square (STS)

One embodiment of the present invention provides a split-to-square (STS) splitting structure. The split-to-square splitting structure refers to a partitioning structure in which square splitting is further performed in addition to the binary/ternary tree splitting in the quadtree plus binary/ternary tree splitting. Here, the split-to-square splitting means a process of splitting a block into square sub-blocks. That is, in the quadtree plus binary/ternary tree splitting, when a ratio of the horizontal size and the vertical size of a block is 1:1, 1:4, or 4:1, the split-to-square structure is applied. For example, when the split-to-square structure is applied to a block having a 64×16 size, four CUs having a 16×16 size are generated.

Figures 19, 20:
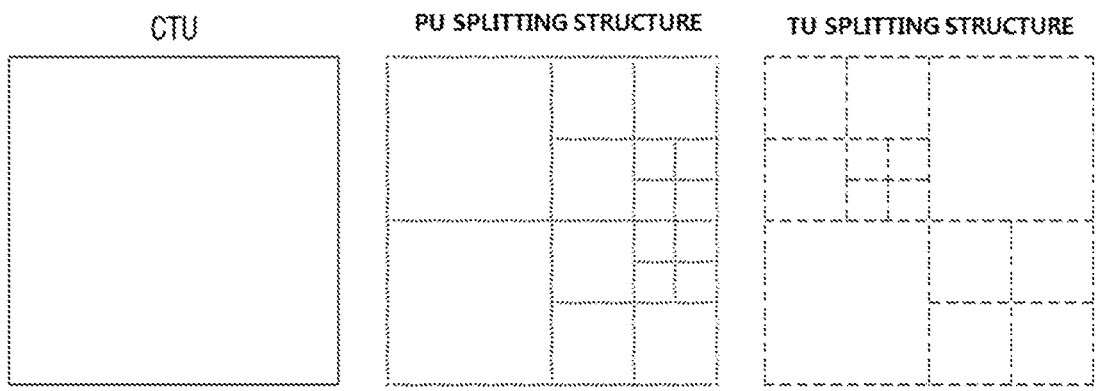
FIG. 19 is a diagram illustrating signaling of information on split-to-square splitting.
FIG. 20 is a diagram illustrating separated PU/TU tree splitting structures according to an embodiment of the present invention.

In the present embodiment, FIG. 19 illustrates a binarization table for signaling of information on the STS structure.

The leaf node in the splitting structures according to the above-described embodiments of the present invention is defined as a CU. In this case, the CU is used as the basic unit of prediction or transform without being additionally split.

That is, among the quadtree plus binary tree splitting structure, the combined quadtree and binary tree splitting structure, the quadtree plus binary/ternary tree splitting structure, and the split-to-square splitting structure, a CU, a PU, and a TU may have the same shape and size in at least one of the splitting structures.

In addition, the choice of intra prediction or inter prediction is determined on a per-CU basis. That is, in the quadtree plus binary tree block splitting structure, at least one process among intra prediction, inter prediction, transform, inverse transform, quantization, dequantization, entropy-encoding/decoding, and in-loop filtering is performed on a per square block basis or a per non-square (rectangular) block basis.

One CU consists of one luma component block Y and two chroma component blocks Cb and Cr. Alternatively, one CU can consist of only one luma component block or only two chroma component blocks. Further alternatively, one CU may consist of only one luma component block, only a Cr chroma component block, or only a Cb chroma component block.

Separated PU/TU Tree Splitting

One embodiment of the present invention provides a separated PU/TU tree splitting structure. The separated PU/TU tree splitting structure refers to a partitioning structure in which a CTU is not split into CUs but is split into PUs and TUs. The PU splitting and the TU splitting can be performed by at least one of the quadtree splitting, the binary tree splitting, the ternary tree splitting, and the split-to-square splitting. Splitting information on PUs or TUs may be signaled on a per PU basis or a per TU basis.

For example, when a PU is split, a first flag indicating whether a PU is further split by the quadtree splitting structure or whether no further splitting is performed is signaled. When a TU is split, a first flag indicating whether a TU is split by the quadtree structure or whether no further splitting is performed is signaled.

FIG. 20 is a diagram illustrating one example of the separated PU/TU tree splitting.

In the separated PU/TU tree splitting, one PU may include a plurality of TUs or one TU may include a plurality of PUs. That is, the boundary of one PU may include the boundaries of TUs, and the boundary of one TU may include the boundaries of PUs.

In the separated PU/TU tree structure, since block splitting on a CU is not performed, the leaf nodes of a PU are used as the optimal units only for intra prediction, inter prediction, and motion compensation, and the leaf nodes of a TU are used as the optimal units only for transform, inverse transform, quantization, dequantization, and transform coefficients encoding/decoding. That is, whether intra prediction or inter prediction is used is determined on a per PU basis.

For the separated PU/TU tree splitting, at least one of maximum/minimum size information of a CTU, maximum/minimum size information of a PU, maximum depth information of a PU, maximum/minimum size information of a TU, and maximum depth information of a TU is entropy-encoded/decoded at the level of at least one of a video parameter set (VPS), a sequence parameter set (SPS), a picture parameter set (PPS), a tile header, a slice heater, a CTU, and CU. In addition, at least one of the maximum/minimum size information of a CTU, the maximum/minimum size information of a PU, the maximum depth information of a PU, the maximum/minimum size information of a TU, and the maximum depth information of a TU is a fixed value preset at the encoder side and the decoder side, or a variable value derived from the coding parameters of the current block.

For example, a CTU has a 128×128 size, the maximum size of a PU may be 128×128, and the maximum size of a TU may be 128×128. In addition, the minimum size of a PU and the minimum size of a TU may be 4×4. The depth of a PU may range from zero at which the size of the PU is equal to the size of the CTU to a value corresponding to the minimum size of 4×4. Similarly, the depth of the TU may range from zero at which the size of the TU is equal to the size of the CTU to a value corresponding to the minimum size of 4×4.

For the PU splitting and the TU splitting in the separated PU/TU tree splitting, the above-described CU splitting method can be used.

Splitting structure information indicating which splitting structure needs to be used is signaled. The splitting structure information indicates at least one of the quadtree plus binary tree splitting, the combined quadtree and binary tree splitting, the quadtree plus binary/ternary tree splitting, the split-to-square splitting, and the separated PU/TU tree splitting. Here, the splitting structure information may be signaled at a level of at least one of a video parameter set (VPS), a sequence parameter set (SPS), a picture parameter set (PPS), a tile header, a slice header, and a CTU.

Among the embodiments described below, at least one method or any combination of two or more methods can be used in at least one of the above-described splitting structures including the quadtree plus binary tree splitting, the combined quadtree and binary tree splitting, the quadtree plus binary/ternary tree splitting, the split-to-square splitting, and the separated PU/TU tree splitting.

That is, the block splitting structure in the following description refers to at least one of the quadtree plus binary tree splitting, the combined quadtree and binary tree splitting, the quadtree plus binary/ternary tree splitting, the split-to-square splitting, and the separated PU/TU tree splitting.

The block splitting structures according to the embodiments of the present invention are valid for PU or TU splitting as well as for CU splitting.

For PUs that serve as the basic units of intra prediction, inter prediction, and motion compensation, the PUs can be recursively split using at least one of the block splitting structures described above. In this case, for each PU, at least one parameter of the coding parameters of the nearest neighboring PU among multiple neighboring PUs can be used for at least one of intra prediction, inter prediction, and motion compensation.

Each TU serving as the basic unit of transform, inverse transform, quantization, dequantization, and transform coefficients encoding/decoding can be recursively split using at least one of the block splitting structures described above. In this case, for each TU, at least one of the coding parameters of the nearest neighboring TU among multiple neighboring TUs can be used for at least one of the transform, inverse transform, quantization, dequantization, and transform coefficients encoding/decoding.

In addition, when a TU is split by using the block splitting structure described above to generate multiple blocks, an additional transform can be performed on each block by using DC coefficients generated after a primary transform is performed on each of the blocks. Similarly, an additional inverse transform is performed by using DC coefficients of each block generated during a primary inverse transform and then an inverse transform is performed on each of the blocks. The nearest PU (or TU) is a PU (or TU) that shares the horizontal boundary or the vertical boundary with a current PU (or TU), or a PU abutting on the vertex of the current PU (or TU).

In the block splitting structure according to one embodiment of the present invention, motion information (for example, a motion vector, a reference picture index, an inter prediction indicator, etc.) is stored on a per minimum-sized CU basis, and used for inter prediction or motion compensation. For example, the minimum-sized CU is a block size indicated by the MinQTSize, MinBTSize, and MinCUSize.

In the block splitting structure according to one embodiment of the present invention, at least one piece of information that is necessary at a unit level such as a TU, selected from among quantization parameters, coding block flags, transform skip mode information, information indicating whether a primary transform is to be performed, information indicating whether a secondary transform is to be performed, a primary transform index, a secondary transform index, and information indicating whether an overlapping transform is to be performed, may be signaled in units of a minimum block size or a larger size equal to or smaller than a CTU, based on the tree structure. Here, the transform skip mode information may be included in the primary transform index to be signaled.

The overlapping transform refers to a process of transforming the residual block data of neighboring blocks of a current block as well as the residual block data of the current block at the time of performing a transform to eliminate the discontinuity between blocks. Whether the overlapping transform is to be performed may be determined depending on at least one of a block size and an intra prediction mode/direction. The overlapping transform can be performed by two types of one-dimensional transform according to separable transform properties.

In the block splitting structure according to one embodiment of the present invention, the scanning order or the encoding/decoding order of at least one of CUs, PUs, and TUs is determined depending on a block size/shape.

In the block splitting structure according to one embodiment of the present, entropy-decoded splitting information can be used to split a current block according to at least one of the shape (square or non-square) and the size of the current. In addition, when splitting a current block, only the reversed splitting with respect to the current block may be allowed. For example, a current block is first split along a horizontal direction, an additional split of the current block can be performed only along a vertical direction. Conversely, when a current block is first split along the vertical direction, an additional split of the current block can be performed only along the horizontal direction.

For example, in the block splitting structure according to one embodiment of the present invention, when a current block is a binary tree node and the current block is to be further split by one deeper depth, a split-to-nonsquare (non-square splitting) is not performed but only a split-to-square (square splitting) is performed. This additional splitting may be signaled using a first flag (indicating a split-to-square or no further split). In this case, since only splitting information indicating the split-to-square needs to be signaled, the number of bits for signaling the splitting information indicating the split-to-nonsquare can be saved.

Similarly, in the block splitting structure according to one embodiment of the present invention, when a current block is a binary tree node and the current block is to be further split by one deeper depth, the split-to-square is not performed on the current block but only the split-to-nonsquare is performed. The additional splitting is signaled with a first flag (indicating a split-to-nonsquare or no further split). In this case, since splitting information only on the split-to-nonsquare needs to be signaled, the number of bits for signaling the splitting information indicating the split-to-square can be saved.

Figure 21:
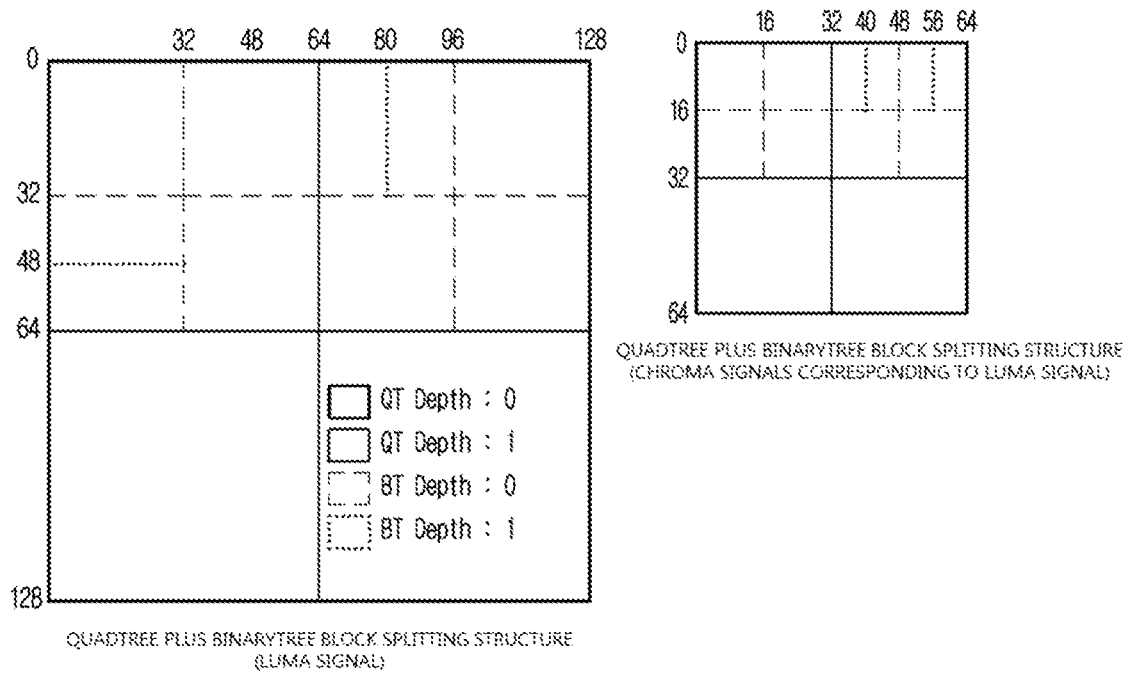
FIG. 21 is a diagram illustrating an example of a CTU that is split first by a quadtree splitting and then by a binary tree splitting at each quadtree depth and each binary tree depth.

FIG. 21 illustrates an example of a CTU that is partitioned by the block splitting structure (i.e., the quadtree plus binary tree splitting) for each of the quadtree depths and each of the binary tree depths. FIG. 21 illustrates an example of a CTU in which a luma signal and a chroma signal are split by different types of the quadtree plus binary tree splitting structures. FIG. 22 illustrates an example of a CTU in which a Cb chroma signal and a Cr chroma signal are split by different types of the quadtree plus binary tree splitting structures.

Here, the way that the splitting method in which the luma signal and the chroma signals within a CTU have different splitting structures is not limitedly valid for the quadtree plus binary tree splitting structure but is also valid for the combined quadtree and binary tree splitting structure, the quadtree plus binary/ternary tree splitting structure, the split-to-square splitting structure, and the separated PU/TU tree splitting structure.

As in the example of FIG. 21, the luma signal and the chroma signals within a CTU can be split by different block splitting structures. For example, the luma signal and the chroma signals within a CTU in a particular slice (for example, I slice or intra slice) can be split by different block splitting structures while the luma signal and the chroma signals within a CTU in each of the other slices (P and B slices) can have the same block splitting structure.

Referring to FIG. 21, when a CTU has a 128×128 size, the CTU is split into four luma signal blocks having a 64×64 size and four chroma signal blocks having a 32×32 size, and different types of the quadtree or binary tree splitting may be applied to the luma signal block and the chroma signal block, respectively.

When the luma signal and the chroma signal within in CTU are split by different block splitting structures, a coded block flag (CBF) indicating whether at least one transform coefficient having a value other than zero exists within the luma signal block may be signaled, and a CBF flag for the chroma signal block may also be signaled.

When the luma signal and the chroma signal within a CTU are split respectively by different block splitting structures, an intra prediction mode for the luma signal and an intra prediction mode for the chroma signal are separately signaled according to any one of information indicating a luma signal or a chroma signal, a block splitting structure, a block size, and a block shape.

When the luma signal and the chroma signal within a CTU are split respectively by different block splitting structures, at least one or at least two of an intra prediction mode of the corresponding luma signal and intra prediction modes of reconstructed neighboring chroma signal blocks are used together at the time of performing intra prediction on the chroma signal. In this case, the intra prediction mode of the co-located luma signal may be derived by calculating the position of the corresponding luma signal block on the basis of the position of the current chroma signal block, by identifying the intra prediction mode of the luma signal located at the calculated position and the intra prediction modes of the neighboring luma signal blocks adjacent to the calculated position, and by selecting at least one intra prediction mode from among the identified intra prediction modes.

When the luma signal and the chroma signal within a CTU are split respectively by different block splitting structures, at least one of filtering methods including deblocking filtering, adaptive sample offset filtering, and adaptive in-loop filtering may be differently applied to the luma signal and the chroma signal, according to at least one of a determination on whether the signal is a luma signal or a chroma signal, a block splitting structure, a block size, and a block shape.

When the luma signal and the chroma signal within a CTU are split respectively by different block splitting structures, by inhibiting an inter-color component prediction in which a prediction block of the chroma signal is obtained on the basis of the reconstructed luma signal, information required to signal the inter-color component prediction method is reduced, thereby improving a coding efficiency.

As in the example of FIG. 22, when a Cb chroma signal and a Cr chroma signal within a CTU can be split respectively by different block splitting structures.

Referring to FIG. 22, when a CTU has a 128×128 size, the CTU is split into four luma signal blocks having a 64×64 size, four Cb chroma signal blocks having a 32×32 size, and four Cr chroma signal blocks having a 32×32 size. Then, at least one of various types of quadtree and binary tree splitting structures may be applied to the luma signal blocks, the Cb chroma signal blocks, and the Cr chroma signal blocks.

For example, in a particular slice (I slice), the Cb chroma signal and the Cr chroma signal within a CTU can be split respectively by different block splitting structures. In addition, the Cb chroma signal and the Cr chroma signal may be encoded/decoded with different intra prediction modes, and the intra prediction modes of the Cb chroma signal and the Cr chroma signal can be separately entropy-encoded/decoded. The intra prediction mode of the Cb chroma signal can be entropy-encoded/decoded by using the intra prediction mode of the Cr chroma signal. Conversely, the intra prediction mode of the Cr chroma signal can be entropy-encoded/decoded by using the intra prediction mode of the Cb chroma signal.

When the Cb signal and the Cr signal which are chroma signals within a CTU are split respectively by different block splitting structures, the coded block flag (CBF) of the Cb signal block may be signaled, and the coded block flag (CBF) of the Cr signal block may be signaled.

When the Cb signal and the Cr signal which are chroma signals within a CTU are split respectively by different block splitting structures, the intra prediction mode of the Cb signal and the intra prediction mode of the Cr signal are separately signaled according to at least one of a determination of whether the signal is a Cb signal or a Cr signal, a block partition structure, a block size, and a block shape.

When the Cb signal and the Cr signal which are chroma signals within a CTU are split respectively by different block splitting structures, when performing intra prediction on the Cb/Cr signal, at least one or at least two of the intra prediction mode of the co-located Cb/Cr signal block and the intra prediction modes of the reconstructed neighboring Cb/Cr signal blocks may be used.

When the Cb signal and the Cr signal which are chroma signals within a CTU are split respectively by different block splitting structures, at least one of the deblocking filtering, the adaptive sample offset, and the adaptive in-loop filtering is differently performed on the Cb signal and the Cr signal, depending on at least one of information indicating the Cb signal or the Cr signal, a block split structure, a block size, and a block shape.

When the Cb signal and the Cr signal which are chroma signals within one CTU are split respectively by different splitting structures, by inhibiting an inter-color component residual signal prediction method in which prediction of a Cr/Cb residual signal is performed on the basis of the reconstructed Cb/Cr residual signal, information required to signal information on the inter-color component residual signal prediction method can be saved, and thus coding efficiency can be improved.

In the block splitting structure according to one embodiment of the present invention, no further split may be performed under conditions in which a block size is equal to or less than a particular block size and a block partition depth is equal to or less than a particular block partition depth.

Here, information of the particular block size or the particular block partition depth may be entropy-encoded/decoded at a level of at least one of a video parameter set (VPS), a sequence parameter set (SPS), a picture parameter set (PPS), a tile header, a slice header, a CTU, and a CU.

In addition, the information of the particular block size or the particular block partition depth may be entropy-encoded/decoded at each level to have different parameter values.

In addition, the information of the particular block size or the particular block partition depth may be entropy-encoded/decoded separately for a luma signal and a chroma signal to have different parameter values.

In addition, the information of the particular block size or the particular block partition depth may be entropy-encoded/decoded separately for a Cb chroma signal and a Cr chroma signal to have different parameter values.

In addition, information on the particular block size or the particular block depth may be determined on the basis of the comparison between the depth or size of the current block and a predetermined threshold value. The predetermined threshold value refers to a reference depth or size that determines the block structure. The predetermined threshold value may be represented in the form of at least one of a minimum value and a maximum value. The predetermined threshold value may be a fixed value preset at the encoder side and the decoder side, a variable value derived on the basis of the coding parameters of the current block, or a value signaled as being included within a bitstream.

At this time, no further block splitting may be performed depending on the information of the particular block size or the particular block depth. Therefore, at least one of a flag and an index indicating a splitting structure may not be signaled when a block size is equal to or less than the particular block size or when a block depth is equal to or less than the particular block depth.

For example, in the quadtree plus binary/ternary tree splitting structure, when no further splitting is performed according to the particular block size or the particular block depth, at least one of a first flag, a second flag, a third flag, a fourth flag, and a first index may not be signaled: the first flag indicating whether the quadtree splitting needs to be performed; the second flag indicating whether the binary/ternary tree splitting needs to be performed; the third flag indicating a horizontal split or a vertical split; the fourth flag indicating a binary tree splitting or a ternary tree splitting; and the first index indicating the type of binary tree splitting.

For example, when a CU is split by the quadtree plus binary tree splitting structure, at least one of a first flag and a first index may not be signaled: the first flag indicating whether the quadtree splitting needs to be performed or no further splitting needs to be performed; and the first index indicating a horizontal symmetric split, a vertical symmetric split, or no further splitting.

For example, when a CU is split by using the quadtree plus binary tree splitting structure, at least one of a first flag, a second flag, and a third flag may not be signaled: the first flag indicating whether the quadtree splitting needs to be performed or no further splitting needs to be performed; the second flag indicating whether the binary tree splitting needs to be performed or no further splitting needs to be performed; and the third flag indicating a horizontal symmetric split or a vertical symmetric split.

For example, when a CU is split by a binary tree symmetric splitting which is one type of the quadtree plus binary tree splitting structure, a first index indicating a horizontal symmetric split, a vertical symmetric split, or no further splitting may not be signaled.

For example, when a CU is split by using a binary tree asymmetric splitting structure which is one type of the quadtree plus binary tree splitting structure, at least one of a first flag, a second flag, and a third flag (or a first index) may not be signaled: the first flag indicating a horizontal split or a vertical split; the second flag indicating a symmetric split or an asymmetric split; and the third flag or the first index indicating a particular asymmetric split type among various asymmetric split types.

For example, when a CU is split by using the combined quadtree and binary tree splitting structure, at least one of a first index, a first flag, and a second index may not be signaled: the first index indicating a quadtree splitting, a binary tree splitting, or no further splitting; the first flag indicating a horizontal split or a vertical split; and the second index indicating splitting position information.

For example, when a PU is split by using the separated PU/TU tree splitting structure, a first flag indicating whether a quadtree splitting or no further splitting needs to be performed may not be signaled.

For example, when a TU is split by using the separated PU/TU tree splitting structure, a first flag indicating whether a quadtree splitting or no further splitting needs to be performed may not be signaled.

In the block splitting structure according to one embodiment of the present invention, transform coefficients (including a quantized level) may be encoded/decoded by using at least one of transform, inverse transform, quantization, and dequantization.

When performing transform or inverse transform, a portion of transform coefficients corresponding to a high frequency component are eliminated, while leaving only transform coefficients corresponding to a low frequency component. The high frequency-component transform coefficients are located within a lower right region of a transform coefficient block, and the low frequency-component transform coefficients are located within an upper left region of the transform coefficient block. The process of eliminating the high frequency-component transform coefficients may be performed when the coefficient block has a size equal to or larger than an M×N size. Here, M and N are positive integers and both of them may be, for example, 64.

For example, when there is a block having a M×N size and M is equal to or greater than 64, transform coefficients located within left 32 columns are maintained. When N is equal to or greater than 64, only transform coefficients within upper 32 rows are maintained.

For example, when there is a block having an M×N size and M is equal to or greater than 32, only the transform coefficients within left 16 columns are maintained. When N is equal to or greater than 64, only the transform coefficients within upper 32 rows are maintained.

For example, when there is a block having a M×N size and M is equal to or greater than 64, only the transform coefficients within left 32 columns are maintained. When N is equal to or greater than 16, only the transform coefficients within upper 8 rows are maintained.

A portion of the high frequency-component transform coefficients may undergo quantization or dequantization with a bit depth equal to or less than the bit depth of an input signal, and a portion of the low frequency-component transform coefficients may undergo quantization or dequantization with a bit depth equal to or greater than the bit depth of the input signal. In this case, a process of performing quantization/dequantization with a low bit depth is performed on the high frequency-component transform coefficients when the horizontal size and the vertical size of a block are equal to or greater than M×N. Here, M and N are positive integers and both of them are, for example, 64.

For example, when there is a block having a 64×64 size, an upper left region having a 32×32 size is regarded as a low frequency component region, the transform coefficients located within the other region undergo quantization or dequantization with a lower bit depth than that of the input signal, and the transform coefficients located within the upper left region having a 32×32 size undergo quantization or dequantization with the same bit depth as the input signal.

A portion of the high frequency-component transform coefficients may undergo quantization or dequantization with a quantization parameter greater than that of the quantization parameter of the current block, and a portion of the low frequency-component transform coefficients may undergo quantization or dequantization with a quantization parameter equal to or less than the quantization parameter of the current block. In this case, the process of performing the quantization or dequantization with a quantization parameter greater than that of the current block on the high frequency-component transform coefficients may be performed when the horizontal size and the vertical size are equal to or greater than M×N wherein M and N are positive integers and both of them may be, for example, 64.

For example, when there is a block having a 64×64 size, an upper left region having a 32×32 size is regarded as a low frequency component region. Quantization or dequantization is performed on the transform coefficients located within the remaining region by using a quantization parameter which is the sum of a value of P and the quantization parameter of the current block, in which P is a positive integer. On the other hand, quantization or dequantization is performed on the transform coefficients located within the upper left region having the 32×32 size by using the quantization parameter of the current block.

A portion of a residual signal is divided into a most significant bit (MSB) and a least significant bit (LSB) along a bit plane. Next, at least one of various processes including a primary transform, a secondary transform, quantization, a primary inverse transform, a secondary inverse transform, dequantization, and entropy-encoding/decoding is performed for each of the MSB and the LSB.

For example, when the residual signal consists of 11 bits, upper six bits are classified as the MSBs and lower five bits are classified as the LSBs. This process is performed when the horizontal size and the vertical size of a block is equal to or greater than M×N in which M and N are positive integers and both of them are, for example, 64.

A portion of the transform coefficients are divided into MSBs and LSBs along a bit plane. Next, quantization or dequantization may be performed on the MSBs and LSBs using different quantization parameters, respectively. The quantization or dequantization may be performed on the MSBs by using a quantization parameter equal to or less than the quantization parameter of the current block, and the quantization or dequantization may be performed on the LSBs by using a quantization parameter greater than the quantization parameter of the current block.

For example, when an input signal for the quantization or the dequantization consists of 10 bits, upper five bits are classified as MSBs and lower five bits are classified as LSBs. In this case, the process described above is performed when the horizontal size and the vertical size of the block are equal to or greater than M×N, in which M and N are positive integers and both of them are, for example, 64.

In the block splitting structure according to one embodiment of the present invention, a CU may have a non-square shape, and a quantization matrix used in the quantization and dequantization processes may have a non-square shape.

At the encoder side, the quantization coefficients in a coefficient matrix are scanned to transform a two-dimensional array of quantization coefficients into a one-dimensional array of quantization coefficients. At the decoder side, the quantization coefficients in a matrix are scanned to transform a reconstructed one-dimensional array of quantization coefficients into a non-square two-dimensional array of quantization coefficients. The quantization coefficients arranged in a two dimensional quantization matrix may be a default quantization matrix defined at the encoder side and the decoder side.

FIGS. 23A, 23B, 23C, 23D, 23E, and 23F) illustrates exemplary methods of scanning a reconstructed quantization coefficients matrix.

For example, as illustrated in FIG. 23A, a diagonal scan is used to transform a one-dimensional matrix of reconstructed quantization coefficients into a two-dimensional matrix of quantization coefficients. In this case, the scanning is performed in a diagonally upward direction from the lower left corner to the upper right corner direction. When the scanning is performed toward the upper right corner from the lower left corner, this scan is called an up-right scan. When the scanning is performed toward the lower left corner from the upper right corner, this scan is called a down-left scan. FIG. 23A illustrates an example of the diagonal up-right scan.

For another example, as illustrated in FIG. 23B, a vertical scan is used to transform a reconstructed one-dimensional quantization coefficients matrix into a two-dimensional quantization coefficients matrix. This vertical scan is a method of preferentially scanning the coefficients in the first column.

For a further example, as illustrated in FIG. 23C, a horizontal scan is performed to transform a reconstructed one-dimensional quantization coefficients matrix into a two-dimensional quantization coefficients matrix. The horizontal scan is a method of preferentially scanning the coefficients in the first row first.

For a further example, as illustrated in FIG. 23D, a block-based diagonal scan is used to transform a reconstructed one-dimensional quantization coefficients matrix into a two-dimensional quantization coefficients matrix. In this case, the block size may be 4×4, and the scanning is performed from the lower left corner to the upper right corner as illustrated in FIG. 23D or from the upper right corner to the lower left corner. FIG. 23D illustrates an example of the up-right scan of the block-based diagonal scans for a block having a 8×4 size.

For a further example, as illustrated in FIG. 23E, a block-based vertical scan is performed for a 8×4 block to transform a reconstructed one-dimensional quantization coefficients matrix into a two-dimensional quantization coefficients matrix. In this case, the block size may be 4×4, and the blocks located on the first column are scanned first.

For a further example, as illustrated in FIG. 23F, a block-based horizontal scan is performed for a 4×8 block to transform a reconstructed one-dimensional quantization coefficients matrix into a two-dimensional quantization coefficients matrix. In this case, the block size may be 4×4, and the blocks located on the first row are scanned first.

That is, when a quantization matrix used for a non-square block has a non-square form as in the examples described above, when the quantization matrix is scanned, the scanning is performed in a non-square form. Alternatively, the non-square quantization matrix is split into M×M square blocks first, the square blocks are sequentially scanned one after another, and a specific square block can also be scanned, in which M is a positive integer.

The quantization coefficients in a reconstructed two-dimensional quantization matrix can be can be reconstructed into a non-square two-dimensional quantization matrix through the dequantization. In this case, the two-dimensional quantization matrix can be reconstructed by using up-sampling, interpolation, DC matrix coefficients substitution, or sub-sampling. Examples of reconstruction of a quantization matrix will be described below.

For example, in the case of a quantization matrix used for transform coefficient blocks having a 16×4 size, a 16×16 reconstructed quantization matrix is sub-sampled with respect to y positions (a row, or a vertical direction) to reconstruct a 16×4 quantization matrix.

For another example, in the case of a quantization matrix used for transform coefficient blocks having a 4×16 size, a reconstructed quantization matrix having a 16×16 size is sub-sampled with respect to x positions (a column or a horizontal direction) to reconstruct a 4×16 quantization matrix.

For a further example, in the case of a quantization matrix used for transform coefficient blocks having a 32×8 size, a reconstructed quantization matrix having a 32×32 size are sub-sampled with respect to y positions (a row or a vertical direction) to reconstruct a 32×8 quantization matrix.

For a further example, in the case of a quantization matrix used for transform coefficient blocks having a 8×32 size, a reconstructed quantization matrix having a 32×32 size is sub-sampled with respect to x positions (a column or a horizontal direction) to reconstruct a 8×32 quantization matrix.

In the block splitting structure according to one embodiment of the present invention, at least one of the coding parameters of reconstructed neighboring blocks may be used as a coding parameter of a current block.

For example, at least one of unit partition information of the reconstructed neighboring blocks, partition information indicating a quadtree splitting is performed, partition information indicating whether a binary tree splitting is performed, a split direction of a binary tree form, a split type (symmetric or asymmetric) of a binary tree form is used as at least one of unit partition information, quadtree partition information, binary tree partition information, binary tree split direction, and binary tree split type of the current block.

For example, at least one of a first flag indicating whether a reconstructed neighboring block is split by quadtree splitting, a second flag indicating whether a binary tree/ternary tree splitting is performed, a third flag indicating a horizontal split or a vertical split, and a fourth flag indicating either a binary tree splitting or a ternary tree splitting is used as at least one of a first flag indicating whether the current block is split by quadtree splitting, a second flag indicating whether the current block is split by a binary tree/ternary tree splitting, a third flag indicating either the vertical split or the horizontal split, and a fourth flag indicating either the binary tree splitting or the ternary tree splitting.

In the block splitting structure according to one embodiment of the present invention, at least one of the coding parameters of reconstructed neighboring blocks is used to derive at least one of the coding parameters of the current block.

For example, at least one of unit partition information of reconstructed neighboring blocks, quadtree partition information indicating whether a reconstructed neighboring block is split by quadtree splitting, binary tree partition information indicating whether a reconstructed neighboring block is split by binary tree splitting, a split direction of a binary tree splitting, and a split type of a binary tree splitting, is used to derive at least one piece of information on the current block, including the unit partition information of the current block, information indicating whether the current block is split by quadtree splitting, information indicating whether the current block is split by binary tree splitting, a split direction of the binary tree splitting, and a split type of the binary tree splitting. In this case, at least one of the coding parameters of the reconstructed neighboring blocks is used to derive at least one of the coding parameters of the current block. This means that at least one of the coding parameters of the current block is determined by at least one of the coding parameters of the reconstructed neighboring blocks.

For example, at least one of a first flag indicating whether the reconstructed neighboring block is split by quadtree splitting, a second flag indicating whether the reconstructed neighboring block is split by binary tree/ternary tree splitting, a third flag indicating either a vertical split or a horizontal split, and a fourth flag indicating either the binary tree splitting or the ternary tree splitting can be used to derive at least one of a first flag indicating whether the current block is split by quadtree splitting, a second flag indicating whether the current block is split by binary tree/ternary tree splitting, a third flag indicating a vertical split or a horizontal split, and a fourth flag indicating at least one of the binary tree splitting and the ternary tree splitting.

In the block splitting structure according to one embodiment of the present invention, at least one of the coding parameters of reconstructed neighboring blocks may be used for intra prediction of the current block.

For example, at least one of intra prediction modes, intra prediction directions, reference sample filtering methods, prediction block filtering methods, prediction block filter taps, and prediction block filter coefficients of reconstructed neighboring blocks is used in a prediction process of a current block.

In the block splitting structure according to one embodiment of the present invention, at least one of the coding parameters of reconstructed neighboring blocks can be used for inter prediction or motion compensation of the current block.

For example, at least one of inter prediction modes, motion information, motion vectors, reference picture indexes, inter prediction directions, inter prediction indicators, reference picture lists, motion vector predictors, motion vector candidate lists, merge mode utilization information on whether a merge mode is used or not, candidate lists, merge candidates, merge candidate lists, skip mode utilization information on whether a skip mode is used or not, interpolation filter types, interpolation filter taps, motion vector sizes, motion vector representation accuracy of reconstructed neighboring blocks may be used in an inter prediction process or a motion compensation process of the current block.

In the block splitting structure according to one embodiment of the present invention, at least one of the coding parameters of reconstructed neighboring blocks may be used for the transform, inverse transform, quantization, or dequantization of the current block. Here, the transform includes at least one of a primary transform and a secondary transform and the inverse transform includes at least one of a primary inverse transform and a secondary inverse transform.

For example, at least one of transform types, transform sizes, information on whether primary transform is used or not, information on whether secondary transform is used or not, primary transform indexes, secondary transform indexes, information indicating presence or absence of residual signals, coding block patterns, coding block flags, quantization parameters, and quantization matrices of reconstructed neighboring blocks may be used in a process of transforming, inverse-transforming, quantizing, or dequantizing the current block.

In the block splitting structure according to one embodiment of the present invention, at least one of the coding parameters of reconstructed neighboring blocks may be used in a process of entropy-encoding/decoding the current block.

For example, at least one of unit partition information, information on whether quadtree splitting is performed, information on whether binary tree splitting is performed, split directions of binary tree splitting, split types of binary tree splitting of the reconstructed neighboring blocks may be used in a process of entropy-encoding/decoding the current block. Here, the entropy-encoding/decoding may include various processes such as binarization/de-binarization method decision, context model decision, context model updating, regular mode execution, and bypass mode execution.

For example, at least one of a first flag indicating whether a reconstructed neighboring block is split by quadtree splitting, a second flag indicating whether a reconstructed neighboring block is split by binary tree/ternary tree splitting, a third flag indicating a vertical split or a horizontal split, and a fourth flag indicating at least one of binary tree splitting and ternary tree splitting may be used for entropy-encoding/decoding the current block.

In the block splitting structure according to one embodiment of the present invention, at least one of the coding parameters of reconstructed neighboring blocks may be used for filtering methods including intra in-loop filtering, deblocking filtering, adaptive sample offset, and adaptive in-loop filtering of the current block.

For example, information on whether an intra loop filter is applied to a reconstructed neighboring block, intra loop filter coefficients, intra loop filter taps, intra loop filter shapes, intra loop filter types, information on a deblocking filter is applied, deblocking filter coefficients, deblocking filter taps, deblocking filter intensities, deblocking filter shapes, deblocking filter types, information on whether adaptive sample offset is applied, adaptive sample offset values, adaptive sample offset categories, information indicating whether or not an adaptive in-loop filter is applied, adaptive in-loop filter coefficients, adaptive in-loop filter taps, adaptive in-loop filter shapes, adaptive in-loop filter types of reconstructed neighboring blocks may be used in a process of applying at least one of the filters such as a deblocking filter, an adaptive sample offset filter, and an adaptive in-loop filter to the current block.

In the block splitting structure according to one embodiment of the present invention, at least one of the coding parameters of a luma signal block may be used as at least one of the coding parameters of a chroma signal block.

In the block splitting structure according to one embodiment of the present invention, at least one of the coding parameters of a luma signal block may be used to derive at least one of the coding parameters of a chroma signal block.

In the block splitting structure according to one embodiment of the present invention, at least one of the coding parameters of a luma signal block may be used for at least one of intra prediction, inter prediction, motion compensation, transform, inverse transform, quantization, dequantization, entropy-encoding/decoding, intra loop filtering, deblocking filtering, adaptive sample offset, adaptive in-loop filtering of a chroma signal block In the block splitting structure according to one embodiment of the present invention, at least one of the coding parameters of a Cb (or Cr) signal block may be used as at least one of the coding parameters of a Cr (or Cb) signal block.

In the block splitting structure according to one embodiment of the present invention, at least one of the coding parameters of a Cb (or Cr) signal block may be used to derive at least one of the coding parameters of a Cr (or Cb) signal block.

In the block splitting structure according to one embodiment of the present invention, at least one of the coding parameters of a Cb (or Cr) signal block may be used in at least one of intra prediction, inter prediction, motion compensation, transform, inverse transform, quantization, dequantization, entropy-encoding/decoding, intra loop filtering, deblocking filtering, adaptive sample offset, and adaptive in-loop filtering of a Cr (or Cb) signal block.

For each block generated by the block splitting structure according to one embodiment of the present invention, at least one piece of information described below may be entropy-encoded/decoded. In addition, a method indicated by the entropy-encoded/decoded information described below may be executed on the basis of at least one piece of information among the pieces of the entropy-encoded/decoded information described below and at least one of a block size and a block shape.

Motion information may include at least one of a motion vector, a reference picture index, an inter prediction indicator, skip mode utilization information (skip_flag), merge mode utilization information (merge_flag), merge index information (merge_index), motion vector resolution information, overlapped block motion compensation information, local illumination compensation information, affine motion compensation information, decoder motion vector derivation information, and bi-directional optical flow information.

Motion vector resolution information may be information indicating a specific resolution is used for at least one of a motion vector and a motion vector difference value. The resolution refers to precision. The specific resolution may be at least one of an inter-pixel unit, a ½-pel unit, a ¼-pel unit, a ⅛-pel unit, a ¹⁄₁₆-pel unit, a ¹⁄₃₂-pel unit, and a ¹⁄₆₄-pel unit.

The overlapped block motion compensation information may be information indicating whether a weighted sum of a prediction block of a current block is calculated by using motion vectors of spatially neighboring blocks adjacent to the current block when performing motion compensation of the current block.

The location illumination compensation information may be information indicating whether at least one of a weighting factor and an offset value is used when generating a prediction block of a current block. Here, the weighting factor and the offset value are values calculated on the basis of a reference block.

The affine motion compensation information may be information indicating whether an affine motion model is used for motion compensation of the current block. Here, the affine motion model is a model of splitting one block into a plurality of sub-blocks using a plurality of parameters, and calculating the motion vectors of the respective sub-blocks using a representative motion vector.

The decoder motion vector derivation information may be information indicating whether a motion vector required for motion compensation is derived and used in a decoder. Depending on the decoder motion vector derivation information, information on the motion vectors may not be entropy-encoded/decoded. When the decoder motion vector derivation information indicates that the motion vector is derived in the decoder and is then used, information on a merge mode may be entropy-encoded/decoded. That is, the decoder motion vector derivation information may indicate whether a merge mode is used in the decoder.

The bi-directional optical flow information may be information indicating whether motion compensation is performed by refining a motion vector in units of a pixel or a sub-block. Depending on the bi-directional optical flow information, the motion vectors in units of a pixel or a sub-block may not be entropy-encoded/decoded. Here, the motion vector refinement refers to a process of changing the value of a block-based motion vector in units of a pixel or a sub-block.

On the other hand, at least one of flags and indexes encoded in the encoder and decoded in the decoder may use at least one of binarization methods described below.

Figure 24:
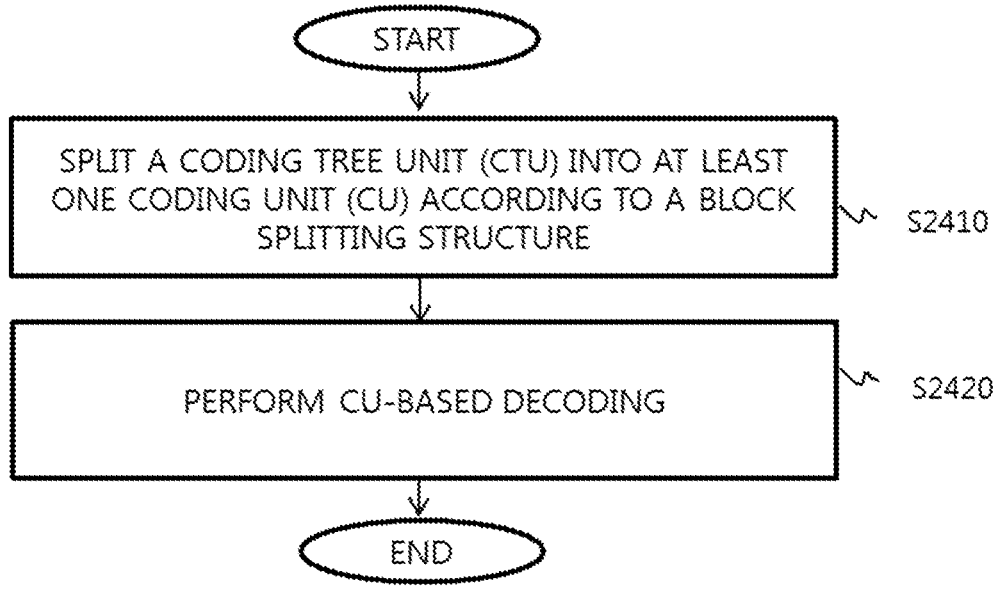
FIG. 24 is a flowchart illustrating an image decoding method according to an embodiment of the present invention.

Truncated rice binarization method
K-th order Exp_Golomb binarization method
Limited K-th order Exp_Golomb binarization method
Fixed-length binarization method
Unary binarization method
Truncated unary binarization method FIG. 24 is a flowchart illustrating am image decoding method according to one embodiment of the present invention.

Referring to FIG. 24, a decoder splits a coding tree unit (CTU) into at least one coding unit (CU) by using a block splitting structure (S2401).

The block splitting structure is configured such that at least one of a binary tree splitting and a ternary tree splitting is performed after a quadtree splitting is performed.

The binary tree includes a vertical binary tree and a horizontal binary tree, and the ternary tree includes a vertical ternary tree and a horizontal ternary tree.

The block splitting structure is determined on the basis of at least one of a first flag indicating whether a quadtree splitting is performed, a second flag indicating whether a binary/ternary tree splitting is performed, a third flag indicating a vertical split or a horizontal split, and a fourth flag indicating either the binary tree splitting or the ternary tree splitting.

The block splitting structure is determined on the basis of at least one of a quadtree root node size, a minimal allowed quadtree leaf node size, a maximal allowed binary tree root node size, a maximal allowed ternary tree root node size, a maximal allowed binary/ternary tree split depth, a minimal allowed binary tree leaf node size, and a minimal allowed ternary tree leaf node size.

At least one of the quadtree root node size, the minimal allowed quadtree leaf node size, the maximal allowed binary tree root node size, the maximal allowed ternary tree root node size, the maximal allowed binary/ternary tree split depth, the minimal allowed binary tree leaf node size, and the minimal allowed ternary tree lead node size is included in a sequence parameter set.

The block splitting structure is determined on the basis of a maximum transform size.

When the CTU is included in an intra slice, the block partitioning structures of a luma signal block and the corresponding chroma signal blocks within the CTU are independently determined.

The decoder performs decoding in units of a coding unit (CU) (S2402).

The decoder performs the decoding by performing at least either one or both of intra prediction and inter prediction in units of a coding unit (CU). The decoder performs the decoding by performing at least one of inverse transform or dequantization in units of a coding unit (CU).

Figure 25:
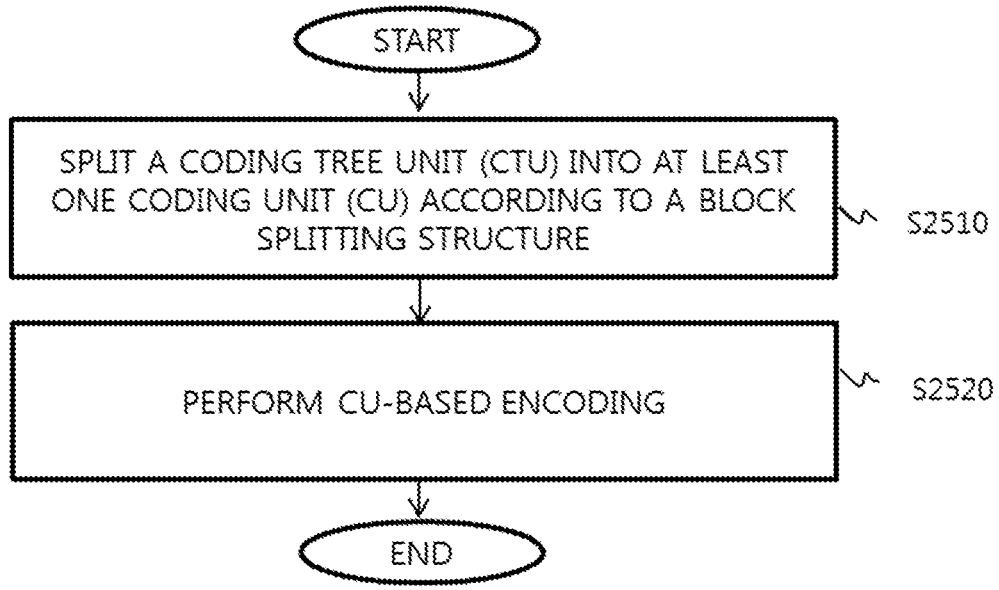
FIG. 25 is a flowchart illustrating an image encoding method according to an embodiment of the present invention.

FIG. 25 is a flowchart illustrating an image encoding method according to one embodiment of the present invention.

Referring to FIG. 25, an encoder splits one coding tree unit (CTU) into at least one coding unit (CU) in accordance with a block splitting structure (S2501).

The block splitting structure is configured such that at least one of a binary tree splitting and a ternary tree splitting is performed after a quadtree splitting is performed.

The binary tree includes a vertical binary tree and a horizontal binary tree and the ternary tree includes a vertical ternary tree and a horizontal ternary tree.

The block splitting structure is represented by using at least one of a first flag indicating whether a, quadtree splitting is performed, a second flag indicating whether a binary/ternary tree splitting is performed, a third flag indicating a vertical split or a horizontal split, and a fourth flag indicating the binary tree splitting or the ternary tree splitting.

The block splitting structure is restricted on the basis of at least one of a quadtree root node size, a minimal allowed quadtree leaf node size, a maximal allowed binary tree root node size, a maximal allowed ternary tree root node size, a maximal allowed binary/ternary tree depth, a minimal allowed binary tree leaf node size, and a minimal allowed ternary tree leaf node size.

At least one of the quadtree root node size, the minimal allowed quadtree leaf node size, the maximal allowed binary tree root node size, the maximal allowed ternary tree root node size, the maximal allowed binary/ternary tree depth, the minimal allowed binary tree leaf node size, and the minimal allowed ternary tree leaf node size is included in a sequence parameter set to be encoded.

The block splitting structure is determined on the basis of a maximum transform size.

When the CTU is included in an intra slice, the block splitting structures of the luma signal and the corresponding chroma signals within the CTU are independently determined.

The encoder performs encoding in units of a coding unit (CU) (S2502).

The encoder performs encoding by performing at least either one or both of intra prediction and inter prediction in units of a coding unit.

A recording medium according to one aspect of the present invention stores a bitstream generated by execution of an image encoding method including: splitting a coding tree unit into at least one coding unit in accordance with a block splitting structure; and performing encoding in units of the coding unit, in which the block splitting structure is configured such that at least one of a binary tree splitting and a ternary tree splitting is performed after a quadtree splitting is performed.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, additional identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image decoding method comprising:
splitting a coding tree unit (CTU) into at least one coding unit (CU) according to a block splitting structure; and
performing CU-based decoding, and
wherein the block splitting structure is configured such that:
at least one of binary tree splitting and ternary tree splitting is performed after quadtree splitting is performed,
when a size of the coding unit is larger than a predefined size, an implicit quadtree splitting is performed, and
when the size of the coding unit is equal to or smaller than the predefined size, an explicit splitting is performed, wherein the explicit splitting is performed based on signaled information,
wherein the block splitting structure is configured such that, when the coding unit crosses both a lower boundary and a right boundary of a picture and the coding unit is larger than a minimum size of a quadtree leaf node, quadtree splitting is implicitly performed.

2. The image decoding method according to claim 1, wherein the predetermined size is 64.

3. The image decoding method according to claim 1, wherein the block splitting structure is configured such that, after performing ternary tree splitting, binary tree splitting in the same direction as the ternary tree splitting for a center block among the blocks, which are divided by the ternary tree splitting, is not allowed.

4. The image decoding method according to claim 1, wherein the block splitting structure is determined on the basis of at least one of the first flag, a second flag indicating whether or not binary/ternary tree splitting needs to be performed, a third flag indicating either a vertical split or a horizontal split, and a fourth flag indicating either the binary tree splitting or the ternary tree splitting.

5. The image decoding method according to claim 4, wherein the first flag and the third flag are entropy-decoded using at least one of a size and a depth of a neighboring block.

6. The image decoding method according to claim 1, wherein the block splitting structure is configured such that, when the height of the coding unit is greater than a predetermined size and the width of the coding unit is same as the predefined size, vertical binary tree splitting is not allowed.

7. The image decoding method according to claim 1, wherein the block splitting structure is configured such that, when the width of the coding unit is greater than a predetermined size and the height of the coding unit is same as the predefined size, horizontal binary tree splitting is not allowed.

8. The image decoding method according to claim 1, wherein when the coding tree unit is included in an intra slice, the block splitting structure of a luma signal of the coding tree unit and the block splitting structure of a chroma signal of the coding tree unit are independently determined of each other.

9. An image encoding method comprising:
splitting a coding tree unit (CTU) into at least one coding unit (CU) according to a block splitting structure; and
performing CU-based encoding, and
wherein the block splitting structure is configured such that:
quadtree splitting is performed first and at least one of binary tree splitting and ternary tree splitting is then performed,
when a size of the coding unit is larger than a predefined size, an implicit quadtree splitting is performed and splitting information for the block splitting structure is not signaled, and when the size of the coding unit is equal to or smaller than the predefined size, an explicit splitting is performed and the splitting information for the explicit splitting is signaled, wherein the block splitting structure is configured such that, when the coding unit crosses both a lower boundary and a right boundary of a picture and the coding unit is lamer than a minimum size of a quadtree leaf node, quadtree splitting is implicitly performed.

10. The image encoding method according to claim 9, wherein the block splitting structure is determined on the basis of at least one of a first flag, a second flag indicating whether or not binary/ternary tree splitting needs to be performed, a third flag indicating either a vertical split or a horizontal split, and a fourth flag indicating either the binary tree splitting or the ternary tree splitting.

11. The image encoding method according to claim 9, wherein when the coding tree unit is included in an intra slice, the block splitting structure of a luma signal of the coding tree unit and the block splitting structure of a chroma signal of the coding tree unit are independently determined of each other.

12. A non-transitory computer readable storage medium storing commands that, when executed by a processor, causes the processor to:

split a coding tree unit (CTU) into at least one coding unit (CU) according to a block splitting structure; and perform CU-based encoding, and wherein the block splitting structure is configured such that:

quadtree splitting is performed first and then at least one of binary tree splitting and ternary tree splitting is performed, when a size of the coding unit is larger than a predefined size, an implicit quadtree splitting is performed and splitting information for the block splitting structure is not signaled, and when the size of the coding unit is equal to or smaller than the predefined size, an explicit splitting is performed and the splitting information for the explicit splitting is signaled, wherein the block splitting structure is configured such that, when the coding unit crosses both a lower boundary and a right boundary of a picture and the coding unit is larger than a minimum size of a quadtree leaf node, quadtree splitting is implicitly performed.

13. The image decoding method according to claim 1, wherein the quadtree splitting is performed based on minimum size information of a quadtree leaf node obtained from a bitstream.

14. The image decoding method according to claim 1, wherein the minimum size information of a quadtree leaf node is obtained for each of a luma signal and a chroma signal.

15. The image decoding method according to claim 1, wherein the method further comprises obtaining maximum size information of a transform block from a bitstream.

\* \* \* \* \*